United States Patent
Free et al.

(10) Patent No.: US 9,201,556 B2
(45) Date of Patent: Dec. 1, 2015

(54) TOUCH LOCATION SENSING SYSTEM AND METHOD EMPLOYING SENSOR DATA FITTING TO A PREDEFINED CURVE

(75) Inventors: M. Benton Free, Saint Paul, MN (US); Bernard O. Geaghan, Salem, NH (US); Karl P. Hauck, Pembroke, NH (US); Billy Lee Weaver, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 2642 days.

(21) Appl. No.: 11/557,829

(22) Filed: Nov. 8, 2006

(65) Prior Publication Data

US 2008/0106520 A1    May 8, 2008

(51) Int. Cl.
G06F 3/046    (2006.01)
G06F 3/0354   (2013.01)
G06F 3/044    (2006.01)

(52) U.S. Cl.
CPC ............ *G06F 3/046* (2013.01); *G06F 3/03545* (2013.01); *G06F 3/044* (2013.01)

(58) Field of Classification Search
USPC ............... 345/156, 173, 177, 179; 178/18.01, 178/18.03, 18.04, 18.06, 19.01, 19.02
See application file for complete search history.

(56) References Cited

U.S. PATENT DOCUMENTS

| | | | |
|---|---|---|---|
| 3,072,849 A | 1/1963 | Firestone | |
| 3,617,922 A | 11/1971 | Bernstein | |
| 3,983,322 A | 9/1976 | Rodgers | |
| 4,029,869 A | 6/1977 | Ingram et al. | |
| 4,289,926 A | 9/1981 | Kobayashi | |
| 4,289,927 A | 9/1981 | Rodgers | |
| 4,343,552 A | 8/1982 | Blades | |
| 4,353,552 A | 10/1982 | Pepper | |
| 4,360,790 A | 11/1982 | Heise | |
| 4,455,451 A | 6/1984 | Kriz | |
| 4,473,717 A | 9/1984 | Parnell et al. | |
| 4,672,154 A | 6/1987 | Rodgers et al. | |
| 4,686,332 A | 8/1987 | Greanias et al. | |
| 4,786,765 A | 11/1988 | Yamanami et al. | |
| 4,848,496 A | 7/1989 | Murakami et al. | |
| 4,878,553 A | 11/1989 | Yamanami et al. | |
| 4,893,115 A | 1/1990 | Blanchard | |

(Continued)

FOREIGN PATENT DOCUMENTS

| | | |
|---|---|---|
| CN | 1512345 | 7/2004 |
| DE | 33 42 522 | 6/1985 |

(Continued)

OTHER PUBLICATIONS

Paul Lorrain and Dale Corson, *Electromagnetic Fields and Waves*, 2d ed. pp. 150-152, W.H. Freeman and Company of San Francisco, CA (1970).

*Primary Examiner* — William Boddie
(74) *Attorney, Agent, or Firm* — Robert S. Moshrefzadeh

(57) ABSTRACT

Methods and devices for determining the location of a touch implement relative to a touch locating sensing device involve developing touch signals at a touch sensor in response to a touch implement on or near the touch surface. Data associated with the touch signals is fitted to a predefined curve. The predefined curve is preferably defined by a charged sphere near a conducting plane, the charged sphere representative of an end of the touch implement and the conducting plane representative of the touch surface. A location of the touch implement is determined relative to the touch surface using the predefined curve to which the data is fitted.

34 Claims, 18 Drawing Sheets

(56) References Cited

U.S. PATENT DOCUMENTS

| | | |
|---|---|---|
| 4,902,858 A | 2/1990 | Yamanami et al. |
| 4,948,926 A | 8/1990 | Murakami et al. |
| 4,956,526 A | 9/1990 | Murakami et al. |
| 4,988,837 A | 1/1991 | Murakami et al. |
| 4,999,461 A | 3/1991 | Murakami et al. |
| 5,028,745 A | 7/1991 | Yamanami et al. |
| RE33,740 E | 11/1991 | Taguchi et al. |
| RE33,805 E | 1/1992 | Yamanami et al. |
| 5,083,118 A | 1/1992 | Kazama |
| 5,122,623 A | 6/1992 | Zank et al. |
| 5,130,500 A | 7/1992 | Murakami et al. |
| 5,138,118 A | 8/1992 | Russell |
| RE34,187 E | 3/1993 | Yamanami et al. |
| 5,191,175 A | 3/1993 | Protheroe et al. |
| 5,194,819 A | 3/1993 | Briefer |
| 5,218,173 A | 6/1993 | Garwin et al. |
| 5,218,174 A | 6/1993 | Gray et al. |
| 5,305,017 A | 4/1994 | Gerpheide |
| 5,337,040 A | 8/1994 | Kind |
| 5,369,227 A | 11/1994 | Stone |
| 5,373,118 A | 12/1994 | Watson |
| 5,374,787 A | 12/1994 | Miller |
| 5,381,137 A | 1/1995 | Ghaem et al. |
| 5,402,151 A | 3/1995 | Duwaer |
| 5,414,227 A * | 5/1995 | Schubert et al. ............... 345/179 |
| 5,420,804 A * | 5/1995 | Tanaka et al. .................... 702/95 |
| 5,475,401 A | 12/1995 | Verrier et al. |
| 5,486,847 A | 1/1996 | Ranf et al. |
| 5,506,375 A | 4/1996 | Kikuchi |
| 5,528,002 A | 6/1996 | Katabami |
| 5,530,210 A | 6/1996 | Fukuzaki |
| 5,557,076 A | 9/1996 | Wieczorek et al. |
| 5,565,658 A | 10/1996 | Gerpheide et al. |
| 5,571,997 A | 11/1996 | Gray et al. |
| 5,594,215 A | 1/1997 | Jeng |
| 5,608,390 A | 3/1997 | Gasparik |
| 5,619,431 A | 4/1997 | Oda |
| 5,629,500 A | 5/1997 | Fukuzaki et al. |
| 5,644,108 A | 7/1997 | Katsurahira et al. |
| 5,661,269 A | 8/1997 | Fukuzaki et al. |
| 5,675,130 A | 10/1997 | Sekizawa |
| 5,682,019 A | 10/1997 | Katsurahira et al. |
| 5,691,512 A | 11/1997 | Obi |
| 5,691,513 A | 11/1997 | Yamamoto et al. |
| 5,693,914 A | 12/1997 | Ogawa |
| 5,706,000 A | 1/1998 | Fukuzaki et al. |
| 5,714,984 A | 2/1998 | Fukuzaki et al. |
| 5,730,165 A | 3/1998 | Philipp |
| 5,748,110 A | 5/1998 | Sekizawa et al. |
| 5,751,229 A | 5/1998 | Funahashi |
| 5,763,839 A | 6/1998 | Funahashi et al. |
| 5,790,106 A | 8/1998 | Hirano |
| 5,792,997 A | 8/1998 | Fukuzaki |
| 5,793,360 A | 8/1998 | Fleck et al. |
| 5,815,091 A | 9/1998 | Dames et al. |
| 5,861,583 A * | 1/1999 | Schediwy et al. ............. 345/173 |
| 5,898,136 A | 4/1999 | Katsurahira |
| 5,914,708 A | 6/1999 | LaGrange et al. |
| 5,914,710 A | 6/1999 | Chen et al. |
| 5,945,980 A | 8/1999 | Moissev et al. |
| 5,973,677 A | 10/1999 | Gibbons |
| 5,986,646 A | 11/1999 | Chen et al. |
| 6,002,387 A | 12/1999 | Ronkka et al. |
| 6,005,555 A | 12/1999 | Katsurahira et al. |
| 6,020,849 A | 2/2000 | Fukuzaki |
| 6,064,374 A | 5/2000 | Fukuzaki |
| 6,075,468 A | 6/2000 | Sugiyama |
| 6,118,435 A | 9/2000 | Fujita et al. |
| 6,133,906 A | 10/2000 | Geaghan |
| 6,137,427 A | 10/2000 | Binstead |
| 6,178,818 B1 | 1/2001 | Plochinger |
| 6,215,476 B1 | 4/2001 | Depew et al. |
| 6,249,234 B1 | 6/2001 | Ely et al. |
| 6,307,385 B1 | 10/2001 | Tardif et al. |
| 6,335,727 B1 * | 1/2002 | Morishita et al. ............. 345/179 |
| 6,380,931 B1 | 4/2002 | Gillespie et al. |
| 6,433,781 B1 | 8/2002 | Oda et al. |
| 6,466,036 B1 | 10/2002 | Philipp |
| 6,476,799 B1 | 11/2002 | Lee et al. |
| 6,546,107 B1 | 4/2003 | Bohnke |
| 6,549,096 B2 | 4/2003 | Groves et al. |
| 6,576,850 B2 | 6/2003 | Fukushima et al. |
| 6,587,098 B2 | 7/2003 | Teterwak |
| RE38,286 E | 10/2003 | Flowers |
| 6,667,740 B2 | 12/2003 | Ely et al. |
| 6,670,561 B2 | 12/2003 | Aoki |
| 6,690,156 B1 | 2/2004 | Weiner et al. |
| 6,762,752 B2 | 7/2004 | Perski et al. |
| 6,790,160 B2 | 9/2004 | Kato et al. |
| 6,927,762 B2 | 8/2005 | Lin |
| 6,970,160 B2 | 11/2005 | Mulligan et al. |
| 7,019,672 B2 | 3/2006 | Ely |
| 7,030,782 B2 | 4/2006 | Ely et al. |
| 7,079,118 B2 * | 7/2006 | Benard et al. ................. 345/177 |
| 7,241,954 B2 | 7/2007 | Kanai |
| 7,265,303 B2 | 9/2007 | Thacker |
| 7,411,584 B2 * | 8/2008 | Hill et al. ....................... 345/173 |
| 7,436,164 B2 | 10/2008 | Vos |
| 7,449,895 B2 | 11/2008 | Ely et al. |
| 7,453,444 B2 | 11/2008 | Geaghan |
| 7,474,300 B2 | 1/2009 | Katsurahira et al. |
| 7,787,259 B2 | 8/2010 | Free et al. |
| 7,812,268 B2 | 10/2010 | Ely |
| 7,907,130 B2 | 3/2011 | Ely |
| 2002/0050983 A1 | 5/2002 | Liu et al. |
| 2003/0001692 A1 | 1/2003 | Chiu et al. |
| 2003/0067447 A1 | 4/2003 | Geaghan et al. |
| 2003/0090347 A1 | 5/2003 | Losehand et al. |
| 2004/0004488 A1 | 1/2004 | Baxter |
| 2004/0092229 A1 | 5/2004 | Hessel |
| 2004/0095333 A1 | 5/2004 | Morag et al. |
| 2004/0104826 A1 | 6/2004 | Philipp |
| 2004/0155871 A1 | 8/2004 | Perski et al. |
| 2004/0233178 A1 | 11/2004 | Silk et al. |
| 2005/0083307 A1 | 4/2005 | Aufderheide et al. |
| 2005/0099188 A1 | 5/2005 | Baxter |
| 2005/0128191 A1 | 6/2005 | Katsurahira et al. |
| 2005/0146513 A1 * | 7/2005 | Hill et al. ....................... 345/173 |
| 2005/0162411 A1 | 7/2005 | Berkel van |
| 2005/0171714 A1 | 8/2005 | Ely et al. |
| 2005/0174259 A1 | 8/2005 | Ely |
| 2006/0016800 A1 | 1/2006 | Paradiso et al. |
| 2006/0022959 A1 | 2/2006 | Geaghan |
| 2006/0038628 A1 | 2/2006 | Khannur |
| 2006/0114247 A1 | 6/2006 | Brown |
| 2006/0125472 A1 | 6/2006 | Howard et al. |
| 2007/0164833 A1 | 7/2007 | Kottschlag |
| 2008/0116990 A1 | 5/2008 | Rokhsaz |
| 2008/0128180 A1 | 6/2008 | Perski et al. |
| 2008/0142281 A1 | 6/2008 | Geaghan |
| 2008/0149401 A1 | 6/2008 | Hagen et al. |
| 2008/0149402 A1 | 6/2008 | Vos |
| 2008/0150550 A1 | 6/2008 | Vos |
| 2008/0150658 A1 | 6/2008 | Vos |
| 2008/0150917 A1 | 6/2008 | Libbey et al. |
| 2008/0150918 A1 | 6/2008 | Hagen et al. |
| 2008/0156546 A1 | 7/2008 | Hauck |
| 2008/0158165 A1 | 7/2008 | Geaghan et al. |
| 2009/0040193 A1 | 2/2009 | Geaghan |
| 2009/0134960 A1 | 5/2009 | Larson et al. |
| 2010/0188832 A1 | 7/2010 | Free et al. |

FOREIGN PATENT DOCUMENTS

| | | |
|---|---|---|
| DE | 298 19 250 | 1/2000 |
| EP | 0 549 956 A1 | 7/1993 |
| EP | 0 607 694 B1 | 3/2000 |
| JP | 59-014043 | 1/1984 |
| JP | 07-319601 | 12/1995 |
| JP | 08179871 | 7/1996 |
| JP | 09-046135 | 2/1997 |
| JP | 10011206 | 1/1998 |
| JP | 11024830 | 1/1999 |
| JP | 11073270 | 3/1999 |

(56) References Cited

FOREIGN PATENT DOCUMENTS

| | | |
|---|---|---|
| JP | 11249798 | 9/1999 |
| JP | 2002-007054 | 1/2002 |
| JP | 2002297300 | 10/2002 |
| JP | 2004062729 | 2/2004 |
| JP | 2004185153 | 7/2004 |
| KR | 10-0601151 B1 | 7/2006 |
| KR | 10-0601152 B1 | 7/2006 |
| WO | WO 92/08206 | 5/1992 |
| WO | WO 93/08551 | 4/1993 |
| WO | WO 96/18171 | 6/1996 |
| WO | WO2004/021328 | 3/2004 |
| WO | WO 2004/036147 | 4/2004 |
| WO | WO 2004/040240 A1 | 5/2004 |
| WO | WO2004/070396 | 8/2004 |
| WO | WO 2006/133159 A2 | 12/2006 |

* cited by examiner

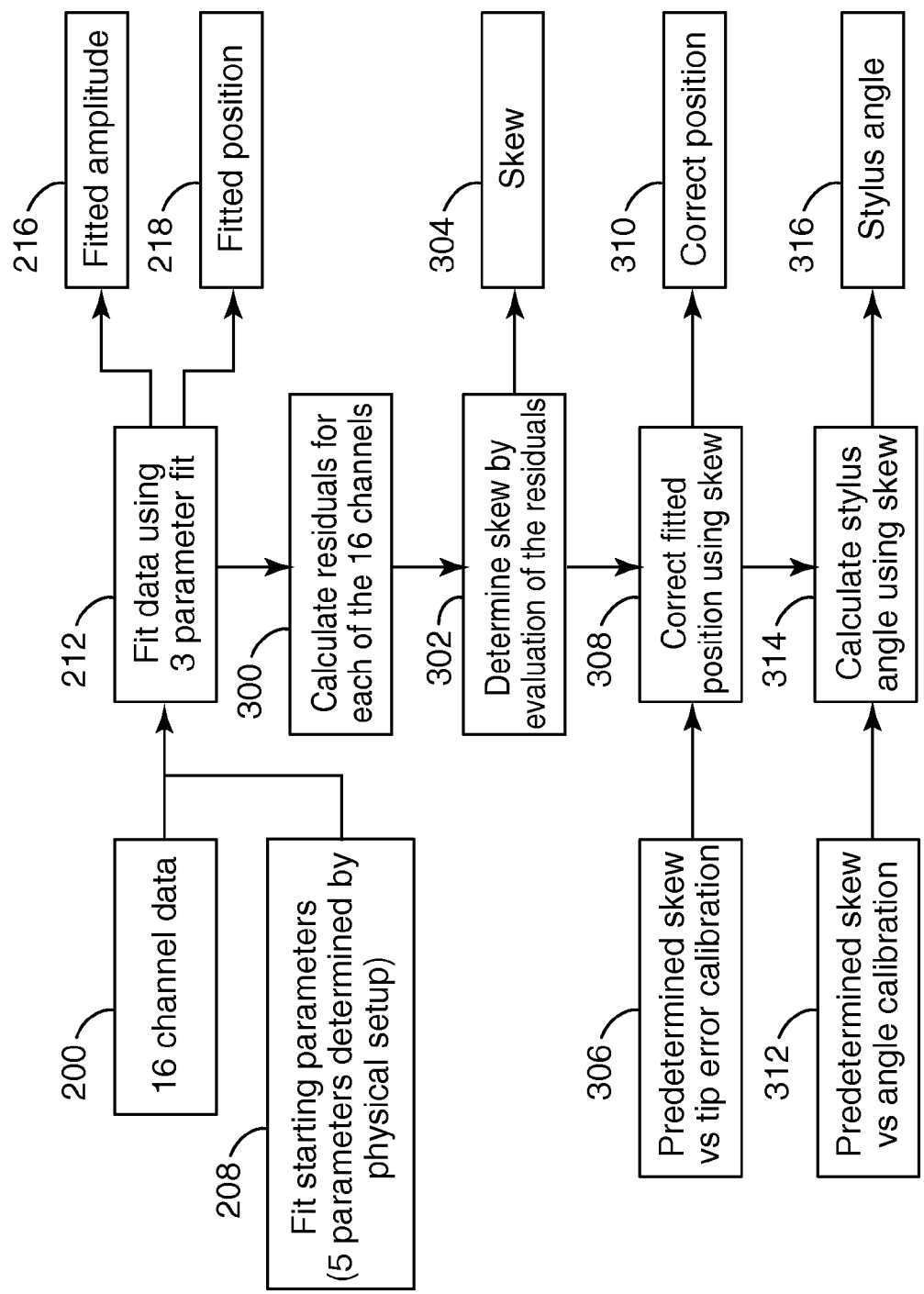

TOUCH LOCATION SENSING SYSTEM AND METHOD EMPLOYING SENSOR DATA FITTING TO A PREDEFINED CURVE

The present invention relates generally to touch location sensing systems and methods and, more particularly, to touch location sensing systems and methods that employ a stylus as a user input implement, alone or in combination with a user's finger.

BACKGROUND

Personal computing systems of varying type and configuration typically provide one or more user interface devices to facilitate user interaction with such computing systems. Well known user interface devices include a keyboard, mouse, trackball, joystick, and the like. Various types of personal computing devices, such as tablet PCs, provide a pen apparatus that can be manipulated by the user, much in the same way as a pencil or ink pen.

Conventional computing devices that provide for user input via a pen or other pointer implement typically employ an electromagnetic inductive system. The electromagnetic inductive system usually comprises an electromagnetic pen or pointer apparatus and a digitizer in the form of a tablet. Changes in pen location relative to the digitizer's sensing surface are detected and location computations are made to determine the coordinates of the pen.

SUMMARY OF THE INVENTION

The present invention is directed to methods and devices for determining the location of a touch implement relative to a touch locating sensing device. Detection methods of the present invention involve developing touch signals at a touch sensor in response to a touch implement on or near the touch surface. Data associated with the touch signals is fitted to a predefined curve. The predefined curve is preferably defined by a charged sphere near a conducting plane, the charged sphere representative of an end of the touch implement and the conducting plane representative of the touch surface. A location of the touch implement is determined relative to the touch surface using the predefined curve to which the data is fitted.

Determining the location of the touch implement may involve interpolating the location using the predefined curve. For example, determining the location of the touch implement may involve determining both an X-Y position and a height of the touch implement relative to the touch surface.

The predefined curve may be defined by a capacitance that varies as a function of distance between the charged sphere and the conducting plane. The predefined curve may be defined by sets of point charges representative of the charged sphere and conducting plane, respectively, that maintain the charged sphere and conducting plane as equipotentials.

The touch implement may comprise a finger, and the end of the touch implement comprises a tip of the finger. The touch implement may comprise a stylus. According to various embodiments, the touch implement may be configured as an untethered battery-less stylus. Methods of the present invention that employ an untethered stylus may involve generating a drive signal at the touch location sensing device, energizing the stylus using the drive signal, and transmitting a stylus signal from the energized stylus to the touch sensor. At the touch sensor, stylus touch signals are developed in response to the stylus signal.

A location of the stylus relative to the touch surface is determined using the predefined curve to which data associated with the stylus touch signals is fitted. The location of the stylus may be determined in terms of one or both of an X-Y position and a height of the stylus relative to the touch surface. According to various embodiments, the touch sensor may be implemented to include a multiplicity of grid conductors, and fitting data associated with the touch signals may involve fitting data associated with a touch signal developed at each of the grid conductors.

Embodiments involving cooperation between an untethered stylus and a touch sensor of the present invention may further involve performing envelope detection on the stylus touch signal, digitizing the envelope signals, and determining one or both of the location and a height of the stylus relative to the touch surface using the predefined curve to which data associated with the digitized envelope signals is fitted.

The location of the stylus may be indicated in a first manner when the stylus is in contact with the touch surface and indicated in a second manner differing from the first manner when the stylus is hovering relative to the touch surface. For example, the first manner may involve presenting a point or other indicia on a display at a location indicative of stylus contact on the touch surface, and the second manner may involve presenting a cursor on the display at a location approximating that of the hovering stylus relative to the touch surface.

Embodiments of the present invention may further involve determining an angle of the stylus relative to the touch sensor. The angle may be determined based on skew of residual data, which represents differences between fitted and raw sensor data. Determining the location of the stylus relative to the touch surface may involve correcting for the angle of the stylus when determining stylus location. The angle may be corrected based on skew of the residual data.

Transmitting the stylus signal may involve transmitting information indicative of one or more stylus states from the energized stylus to the touch sensor. For example, the stylus states may include one or more states equivalent to one or more mouse states.

According to further embodiments, a touch location sensing device of the present invention may include a touch sensor comprising a touch surface and one or more transducers configured to generate touch signals responsive to a touch implement on or near the touch surface. A processor is coupled to the touch sensor. The processor is preferably configured to fit data associated with the touch signals with a predefined curve. The predefined curve is preferably defined by a charged sphere near a conducting plane, the charged sphere representative of an end of the touch implement and the conducting plane representative of the touch surface. The processor is further configured to determine a location of the touch implement relative to the touch surface using the predefined curve to which the data is fitted.

Embodiments of a touch location sensing device of the present invention may include drive circuitry provided at the touch sensor and configured to generate a drive signal. An untethered battery-less stylus may be implemented to include circuitry energized by the drive signal and configured to transmit a stylus signal in response to the drive signal. Stylus touch signals may be developed at the touch sensor in response to the stylus signal, and the processor configured to determine a location of the stylus relative to the touch surface using the predefined curve to which data associated with the stylus touch signals is fitted.

The predefined curve may be defined by a capacitance that varies as a function of distance between the charged sphere and the conducting plane. The predefined curve may be defined by sets of point charges representative of the charged sphere and conducting plane that maintains the charged sphere and conducting plane as equipotentials. The processor may be configured to interpolate the location using the predefined curve.

Touch location sensing device embodiments may include conditioning circuitry comprising an envelope detector coupled to the touch sensor and configured to perform envelope detection on the touch signals to produce envelope signals, and an analog-to-digital converter configured to digitize the envelope signals. The processor may be coupled to the conditioning circuitry and configured to determine one or both of the location and a height of the stylus relative to the touch surface using the predefined curve to which data associated with the digitized envelope signals is fitted.

The processor may be configured to determine an angle of the touch implement relative to the touch sensor, such as by use of skew of residual data. The processor may be configured to correct for the angle of the stylus when determining stylus location. The processor may be configured to correct for the angle based on skew of the residual data.

Embodiments of a touch location sensing device may include a display coupled to the processor. The touch sensor of the touch location sensing device may incorporate a matrix capacitive touch sensor.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 22 is a flow diagram of a method for determining stylus angle and correcting for angle induced positional error in accordance with embodiments of the present invention;

Figure 1:
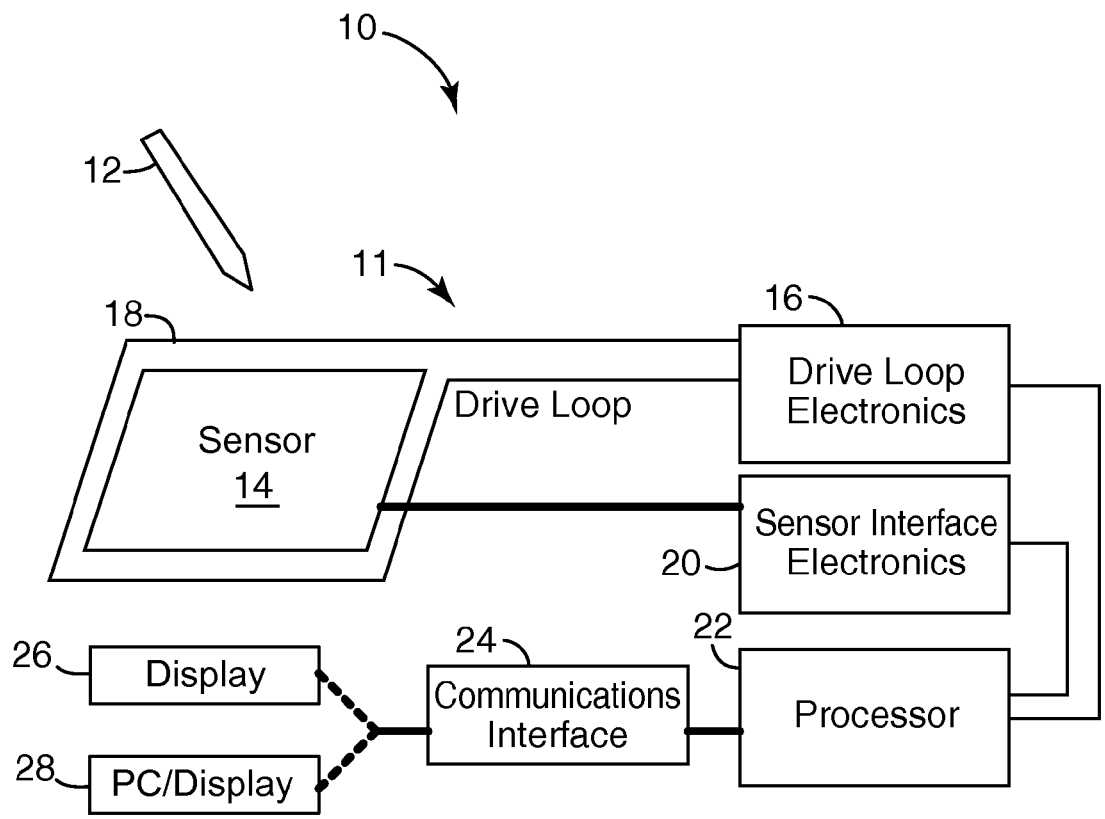
FIG. 1 is a diagram of a touch location sensing system that includes an untethered, battery-less stylus and a touch location sensing device in accordance with embodiments of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention is generally directed to methods and systems for determining the location of a touch implement relative to a touch location sensing device. Embodiments of the present invention provide for improved touch location determinations through use of a curve fitting model that determines the best fit of touch sensor data to a predefined curve. The predefined curve is preferably a curve defined by a charged sphere near a conducting plane, wherein the charged sphere is representative of an end of the stylus and the conducting plane is representative of a touch surface of the sensor. A location of the stylus relative to the touch surface may be determined using the predefined curve to which the data is fitted.

Embodiments of the present invention may also provide for the determination of an angle of the stylus relative to the touch sensor. The stylus angle may be determined based on skew of the fitted data. Determining the location of the stylus relative to the touch surface may involve correcting for the angle of the stylus when determining stylus location. For example, the angle of the stylus may be corrected based on skew of the fitted data.

Various embodiments of a touch location sensing system that incorporates stylus tip position and/or angle determinations of the present invention are illustrated in the Figures. With reference to FIG. 1, a touch location sensing system 10 includes a stylus 12 that interacts with a sensing device 11. The sensing device 11 includes a touch location sensor 14, such as a digitizer. The stylus 12 is preferably configured as a tetherless or cordless implement that does not have a battery. Rather, the stylus 12 derives power from a magnetic field generated by the sensing device 11.

The sensing device 11 is shown to include a drive loop or coil 18 coupled to drive loop electronics 16 that cooperate to generate a magnetic field, which may be a continuously varying magnetic field. The stylus 12, having derived power from the magnetic field emanating from the drive coil 18, broadcasts a signal from which stylus location and status may be determined by the sensing device 11.

The stylus 12 is preferably configured to include one or more user-actuatable buttons or switches, such as those commonly employed to implement various mouse functions (e.g., right and left mouse buttons). The tip of the stylus 12 may incorporate a pressure sensor from which applied pressure can be resolved and transmitted to the sensing device 11. Eraser functionality may also be incorporated at the stylus end opposite the tip.

Sensor interface electronics 20 is coupled to the sensor 14 and facilitates measurement of signals developed at the sensor 14 in response to signals broadcast by the stylus 12. The sensor interface electronics 20 is preferably connected to the sensor 14 via a shielded connector. The sensor interface electronics 20 includes circuitry for measuring the signal levels present on the individual traces of the sensor 14, and is typically configured to reject as much noise as possible.

According to one configuration, the sensor 14 includes a digitizer that incorporates a detection grid and electronics as is known in the art. For example, such a detection grid may include pairs of position resolving conductors each of which forms one or more differential coil elements in the sensor 14, with each conductor pair receiving a magnetic signal transmitted by the stylus 14. An illustrative example of a digitizer having such a detection grid configuration is disclosed in U.S. Pat. No. 5,218,174, which is incorporated herein by reference.

According to another configuration, the sensing device 11 may incorporate a sensor 14 that effectively incorporates a digitizer and a touch-sensitive sensor. The digitizer, according to this configuration, allows the location and status of the stylus 12 to be determined. The touch-sensitive sensor allows the location of a finger touch to be determined. This configuration allows a user to use either the stylus 12 or a finger to indicate a desired location on a computer display, for example, as well as determine the location and status of the stylus 12.

The touch-sensitive sensor 14 typically includes a matrix that capacitively couples to the stylus 12 and/or a finger. In this configuration, the sensor 14 of the sensing device 11 is preferably made up of a series of transparent conductors arranged on a glass or plastic cover that can be placed in front of an LCD display. One side of the glass or plastic sheet has conductors in the X direction, and the opposite side has conductors in the Y direction. Examples of suitable touch sensitive sensors 14 are disclosed in commonly owned U.S. Pat. Nos. 6,133,906 and 6,970,160, in commonly owned U.S. Published Application No. 2005/0083307, in U.S. Pat. Nos. 6,762,752 and 6,690,156, and in U.S. Published Application No. 2004/0095333, each of which is hereby incorporated herein by reference.

An embodiment that incorporates a digitizer and touch-sensitive sensor advantageously allows a user to point a stylus at a computer display and have the location and status of the pointing device determined and, when a finger is used to point at the display device, allows for the determination of the location of a finger touch at the display device. The dual use aspects of this embodiment of a sensing device 11 make it particularly useful in tablet PC applications.

For example, a digitizer arrangement allows a user to use a stylus to input information, indicate operations the user wants to take, and write or draw on the display. The touch-sensitive sensor allows the user to "type" information onto a virtual keyboard on the display screen, for example. This would allow the vendor of the computing system, in which a dual touch location sensor system of the present invention is implemented, to eliminate the keyboard and the associated bulk it requires. It is understood that a digitizer and a touch-sensitive sensor need not be implemented together in all configurations, but inclusion of both sensing devices provides for enhanced user interaction with a computing system that incorporates a sensing system 10 of the present invention.

According to one illustrative embodiment, the drive coil 18 may be constructed of wire, such as 36 gauge wire, looped several times (e.g., 4 times) around the periphery of the frame of sensing device 11. In one implementation, the drive coil 18 may have an inductance of about 21 μH and an impedance of about 14 Ohms at 100 kHz. The drive coil 18 is connected to a signal generator of the drive loop electronics 16. The signal generator may be configured to produce 200 periods of a 100 kHz sine wave signal gated at 250 Hz. The signal generator may, for example, produce an output signal of 0.4 $V_{pp}$, resulting in approximately 28 mA of current that flows in the drive coil 18.

Figure 2:
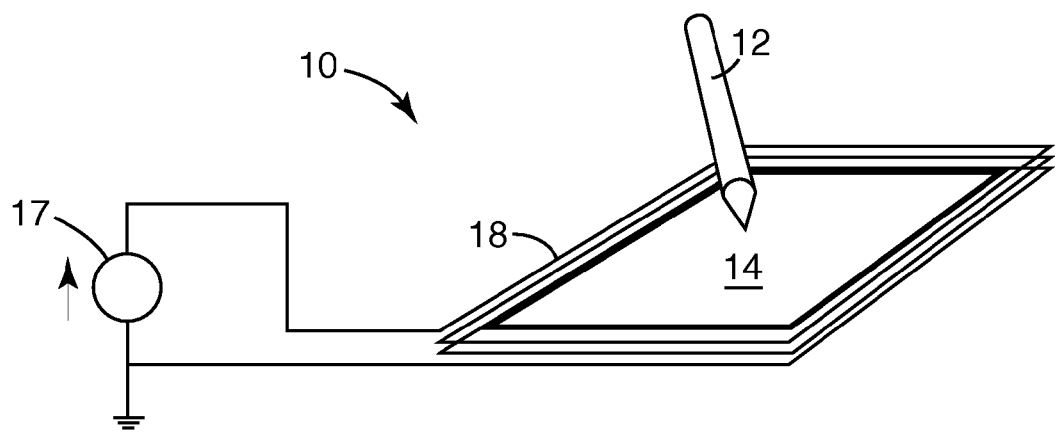
FIG. 2 is a diagram of an apparatus for generating an excitation magnetic field which is received by a stylus in accordance with embodiments of the present invention.

FIG. 2 is a simplified illustration of drive coil 18 and a signal generator 17 that cooperate to generate a magnetic excitation field. In this illustrative example, one or more coils are preferably arranged in the plane of the touch location sensor 14. A sinusoidal current is produced by the signal generator 17 with peak magnitude $A_1$ at radian frequency $\omega_1$ and is applied to the rectangular coil 18.

The stylus 12 is configured to collect energy from the magnetic field emanating from the drive coil 18 using a tank circuit. The tank circuit may initially be tuned to resonate at the frequency that the drive coil 18 is driven. In this illustrative example, the frequency is set at 100 kHz. The tank circuit of the stylus 12 builds amplitude during the burst produced by the drive coil 18 and then gradually loses signal amplitude after the drive coil 18 is turned off. The time associated with the exponential charging and discharging of the resonant tank circuit of the stylus 12 is determined by the capacitive and inductive elements in the tank circuit. Changes in the resonant frequency of the tank circuit, due to drift or purposeful modification (e.g., resulting from stylus switch state changes), may be accommodated by detecting and/or tracking such changes by the sensing device 11. Alternatively, the resonant frequency of the tank circuit can be modified to track changes in the drive frequency of the magnetic field emanating from the drive coil 18.

Figure 3:
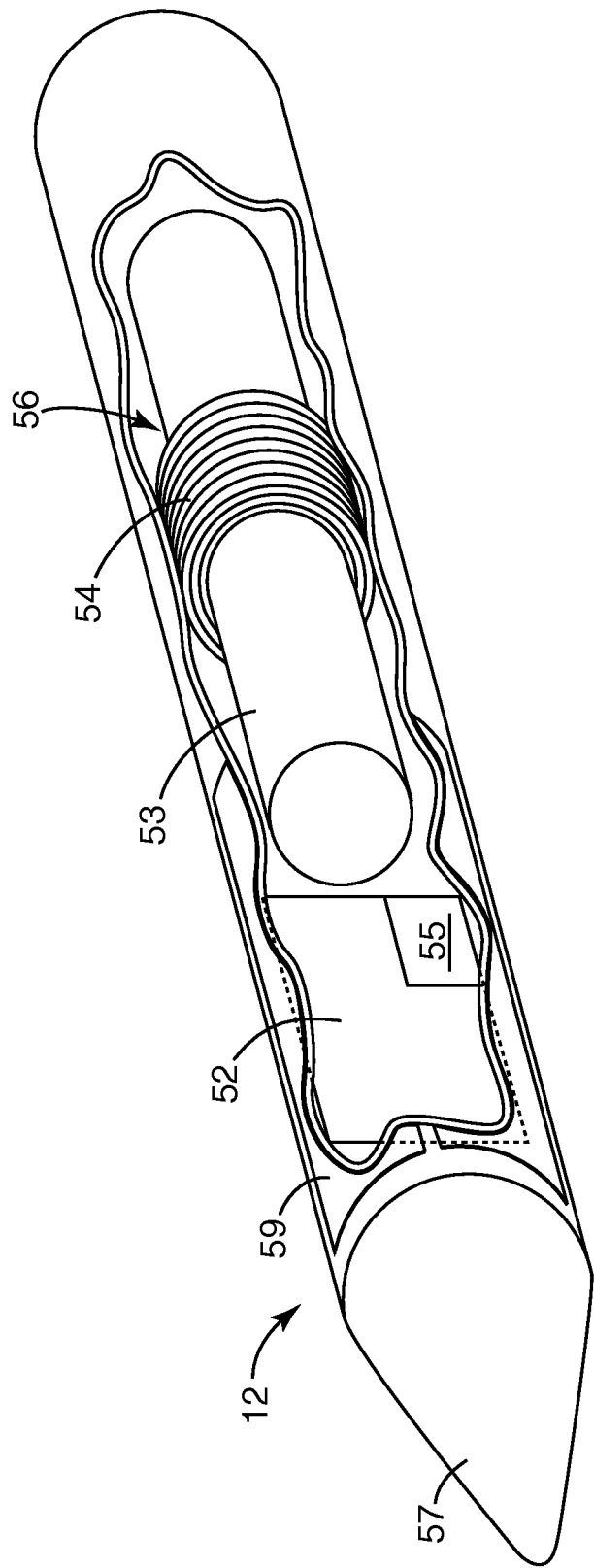
FIG. 3 is a diagram of various components of a touch location sensing device that cooperate with a stylus in accordance with embodiments of the present invention.

Referring now to FIG. 3, there is shown an embodiment of an untethered stylus 12 of the present invention that may be implemented in the context of a touch location sensing system as described herein. In accordance with the embodiment shown in FIG. 3, a stylus 12 houses electronics 52, which may include an oscillator circuit 55, and a coil 54 wrapped around a ferrite cylinder 53. The ferrite cylinder 53 serves to increase signal amplitude. An applied harmonic magnetic field produced at the surface of the touch location sensor (e.g., digitizer) or a display, for example, couples flux to the coil 54 when the stylus 12 is placed in the applied field.

The ferrite coil arrangement 56 resonates with a separate parallel-connected capacitor of the electronics 52 and is initially tuned to the excitation field frequency. The parallel coil-capacitor combination is connected between the stylus tip 57 and the stylus shield 59. The shield 59 may form part of, or otherwise be connected to, the stylus housing so that it can be touched, and therefore grounded, by a user's hand when held. The shield 59 may be situated to extend over the circuitry region of the stylus 12, and preferably has a discontinuous shape, such as a "C" shape, so as to avoid eddy currents that could otherwise arise in a closed loop shield arrangement.

The stylus tip 57 couples capacitively to the touch location sensor from which location information is derived. To provide stylus status information according to one embodiment, the ferrite coil arrangement 56 powers the electronics 52, which may include a low power oscillator or oscillators provided on oscillator circuit 55, that amplitude modulates the stylus tip voltage at the oscillator(s) frequency or frequencies. The frequency of the oscillations is changed to reflect the stylus status, such as switch closures or tip pressure changes.

Figure 4:
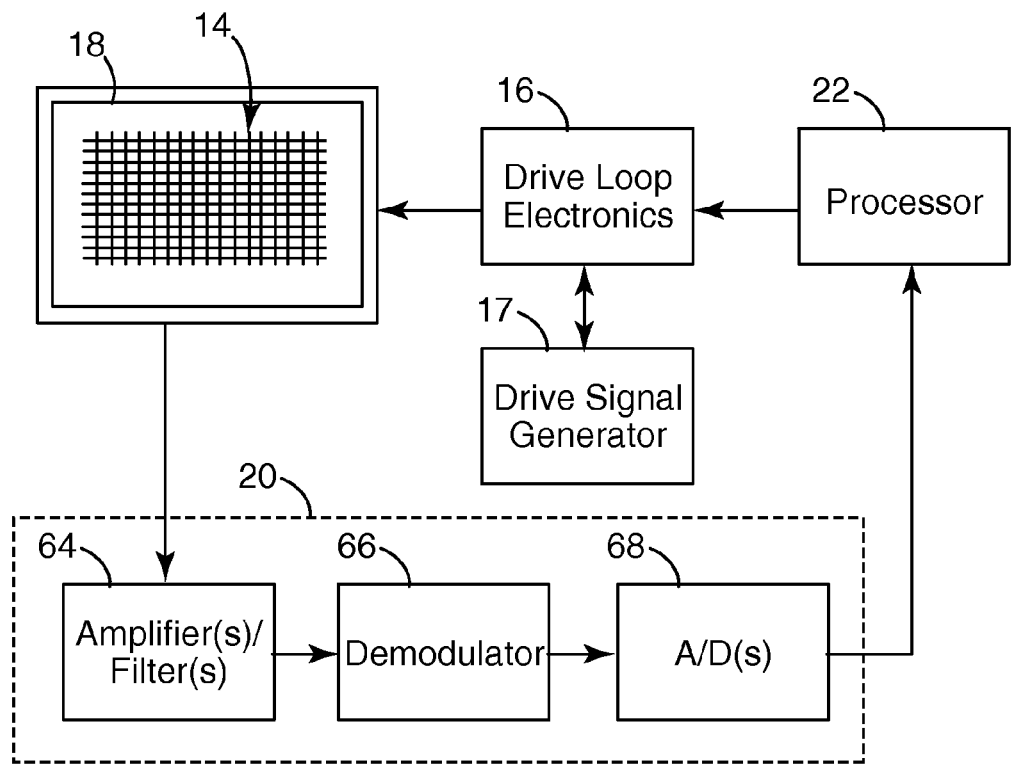
FIG. 4 is an illustration of various components of a stylus implemented in accordance with embodiments of the present invention.

FIG. 4 illustrates additional components of a touch location sensor according to embodiments of the present invention. A processor 22 is coupled to the drive loop electronics 16, sensor interface electronics 20, and a communications interface 24, as is shown in FIG. 1. The processor 22 coordinates the operations of drive loop electronics 16 and sensor interface electronics 20, and is configured to determine stylus/finger location/angle and stylus status. Stylus/finger location/angle and stylus status determinations are preferably made by the processor 22 in accordance with the methodologies described in greater detail hereinbelow.

The stylus location and status information computed by the processor 22 is communicated to a computer and/or display 26 via a communications interface 24, which is shown in FIG. 1. The communications interface 24 may be configured as an RS-232 or USB interface, for example. The processor 22 may be configured to drive a display 26 directly. Alternatively, a computer 28 may be coupled to the communications interface 24 and receive the location and status information from the processor 22, and drive its display. The processor 22 or computer 28 may be configured to control cursor velocity, momentum and other factors to enhance the user experience with the sensing system 11.

The sensor interface electronics 20 of FIG. 4 is shown to include several components, including amplification and filtering circuitry 64, demodulator 66, and analog-to-digital converters 68. According to one approach, stylus signals measured at the electrodes of the touch location sensor 14 are processed by the sensor interface electronics 20 shown in FIG. 4. For example, amplified and filtered stylus signals are processed by a demodulator 66 that may be synchronized to the drive frequency of the drive signal generator 17. Demodulated stylus signals are digitized by A/D(s) 68 and input to the processor 22.

It is noted that other demodulator circuitry may be included within sensor interface electronics 20 to recover stylus status data, and that this status data may be communicated to the processor 22. For example, known amplitude demodulation circuitry may be employed to detect the amplitude modulation of a received stylus signal. Known frequency demodulation circuitry may be used to detect the frequency of the amplitude modulation, such frequency indicating the state of a stylus status switch for example.

Figure 5:
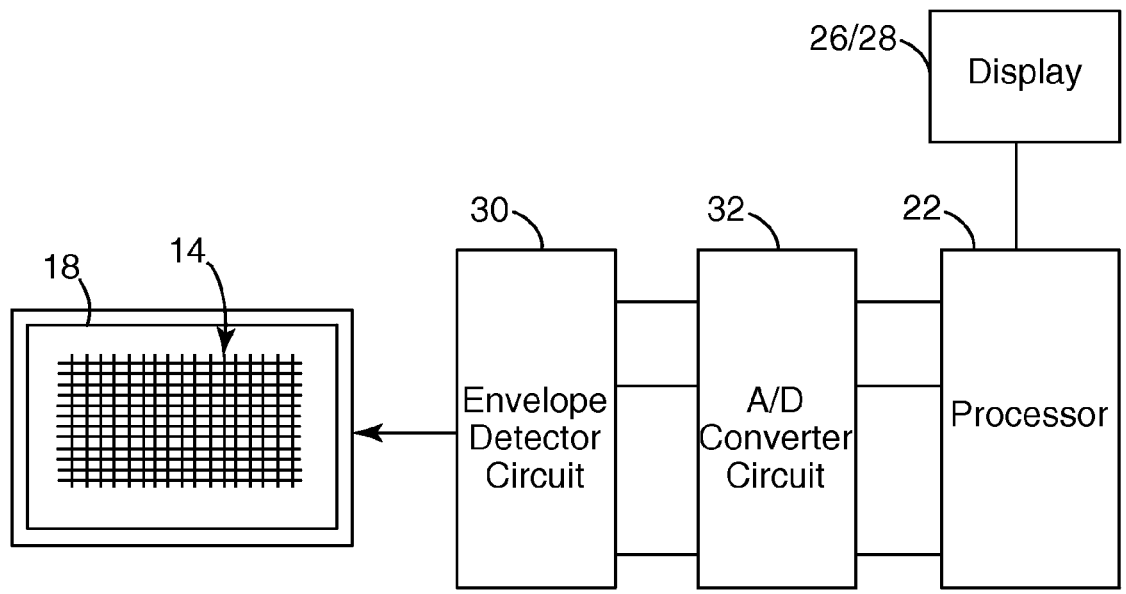
FIG. 5 is a diagram of various components of a touch location sensing device that cooperate with a stylus in accordance with embodiments of the present invention.

FIG. 5 shows another embodiment of a touch location sensing system of the present invention. As is shown in FIG. 5, an envelope detector circuit 30 of the sensor interface electronics 20 is configured to detect signals developed on individual traces of the sensor 14. The signals output by the envelope detector circuit 30 are digitized by an A/D converter circuit 32. Each trace of the sensor 14 may have a dedicated A/D converter 32. Alternatively, two or more traces may share a common A/D converter 32 via a switch having a sufficient switching frequency.

Figure 6:
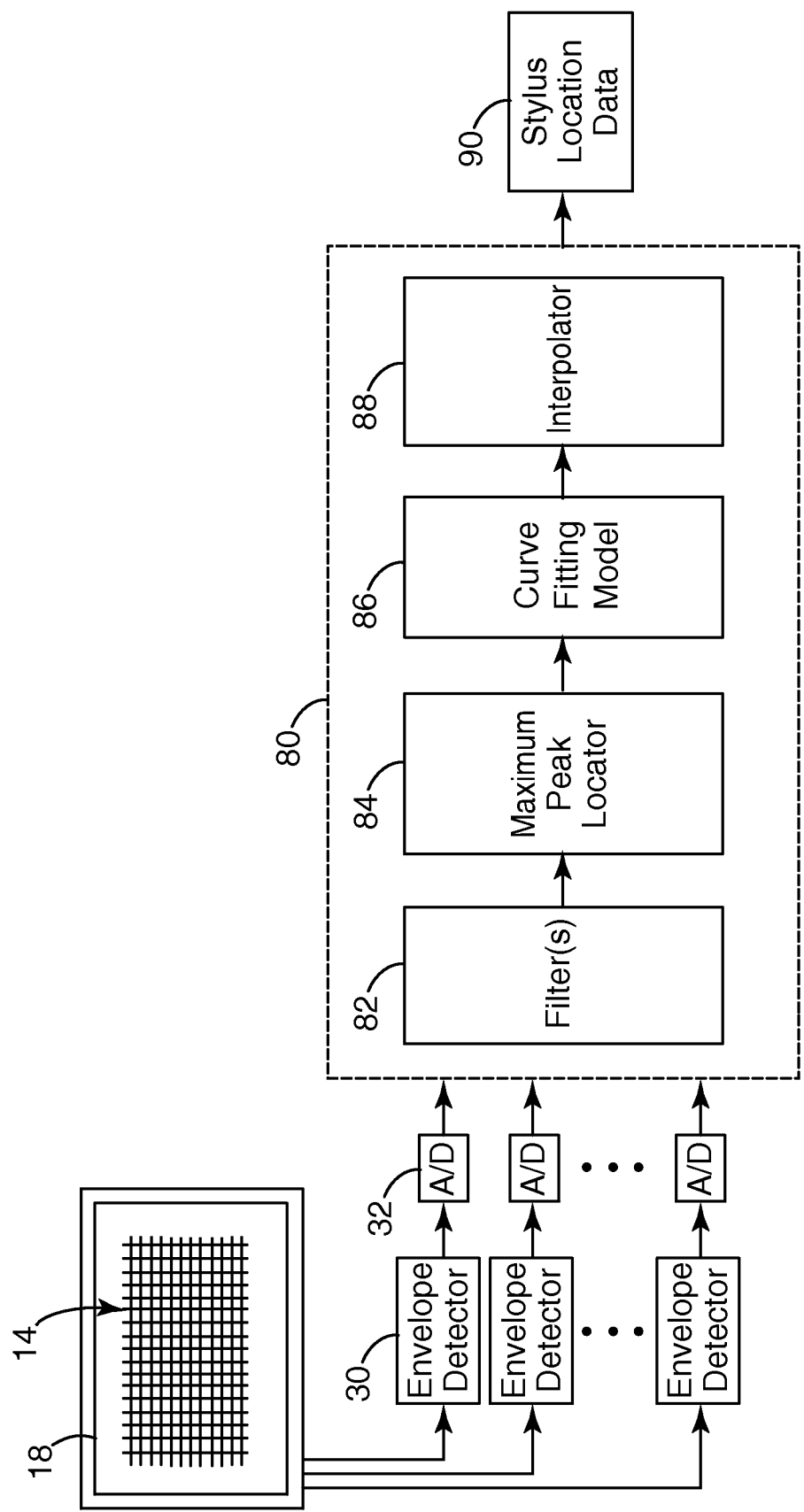
FIG. 6 illustrates various components of a touch location sensor in accordance with other embodiments of the present invention.

FIG. 6 illustrates additional components of a touch location sensor in accordance with embodiments of the present invention. According to one configuration, each trace of the sensor 14 is coupled to the input of an envelope detector 30. Each of the envelope detectors 30 is coupled to an A/D converter 32. For example, if the sensor 14 was configured to include N traces (e.g., 16), N envelope detectors 30 and N A/D converters 32 would be provided. The envelope detectors 30 are preferably configured to provide sufficient gain to make the resultant signal match the requirements of A/D converters 32. The envelope detectors 30 may be configured to generate a signal having the same shape as an imaginary line describing the upper bound of the sensor signal. In such a configuration, the envelope detectors 30 effectively transform the 100 kHz signal (in the illustrative example discussed above) into a low frequency signal that is more readily digitized by the A/D converters 32.

Figure 7:
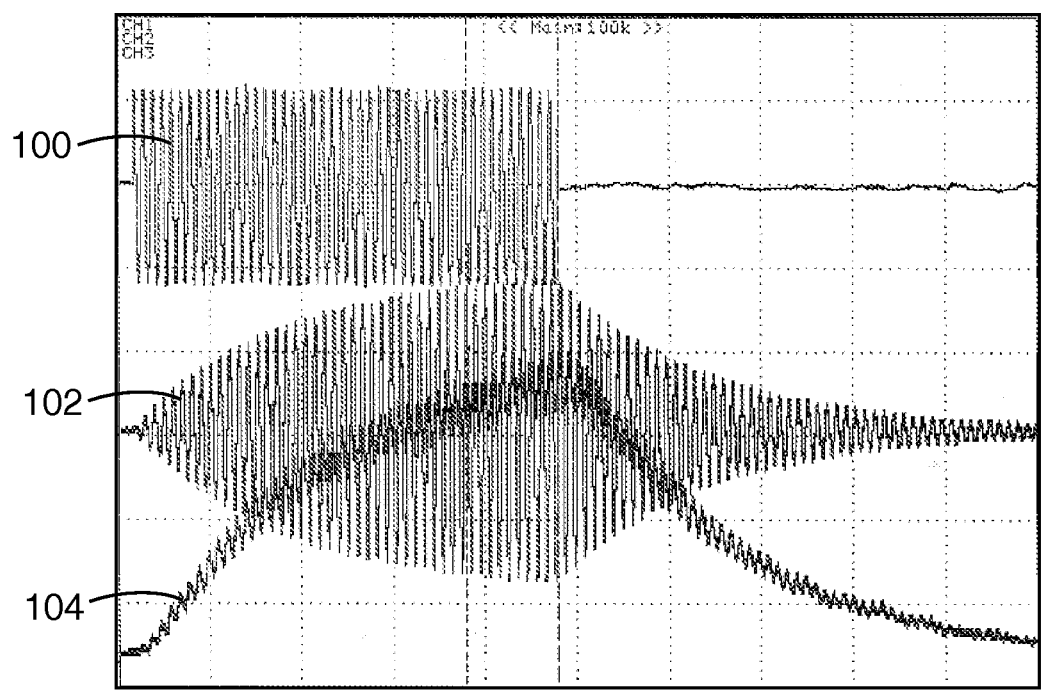
FIG. 7 shows three waveforms associated with stylus signal conditioning implemented by the envelope detectors shown in FIG. 6.

FIG. 7 shows three waveforms associated with stylus signal conditioning implemented by the envelope detectors 30 shown in FIG. 6. Signal trace 100 shows a drive signal burst of 100 kHz on the drive coil 18. Signal trace 102 is the voltage at the stylus responsive to the drive signal burst. Signal trace 104 is the output of one channel of the envelope detector circuit (i.e., one of the envelope detectors 30 shown in FIG. 6). Signal trace 104 represents the envelope of the signal that is produced by the stylus and received by the sensor trace.

The system shown in FIG. 6 includes a signal processing module 80 that performs several operations on digital signals received from the A/D converters 32. In general terms, the signal processing module 80 performs various operations on the trace signals received from sensor 14 for purposes of developing stylus location data 90. Such stylus location data 90 typically includes X-Y location and distance (Z) of the stylus relative to the sensor 14. Other data may be derived from the trace signals received from the sensor 14, such as stylus status data and stylus angle, as will be discussed in detail hereinbelow.

As shown, the signal processing module 80 includes one or more filters 82, a maximum peak locator 84, a curve fitting model 86, and an interpolator 88. It is understood that components of the signal processing module 80 may be implemented in hardware, software, or a combination of hardware and software. According to various embodiments, the signal processing module 80 operates on a length of data that contains several (e.g., at least three) of the pulses shown in FIG. 7.

Figure 8:
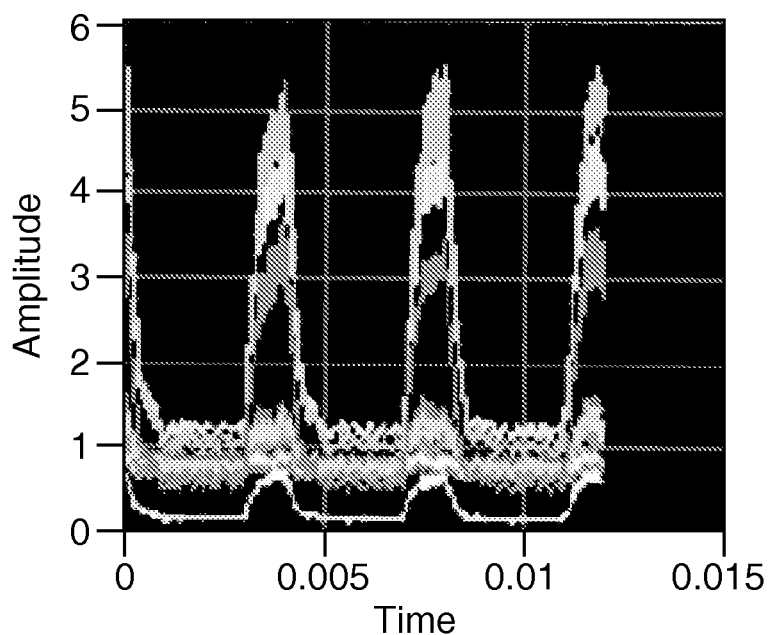
FIG. 8 shows a signal train of a type that is input to the envelope detector circuit shown in FIG. 6.

As was discussed previously, the multiple humps exhibited by trace signals 102 and 104 result from each time the drive coil 18 is given a burst of a 100 kHz drive signal. FIG. 8 shows a signal train of the type described above that is input to the envelope detector circuit 30. This digitized pulse train data is then sent through a series of processing steps vis-à-vis the signal processing module 80 shown in FIG. 6, with the output 90 being N (e.g., 16) values representing the magnitude of the pulse from each of the N traces.

Each of the N input channels to the signal processing module 80 has a pair of constants that can be selected to correct for initial differences in the gain and offset of the signal train in the envelope detector circuit 30. Multiplying by the first constant and adding a second constant value linearly scales the data. These constants may be experimentally determined, such as by looking at the output of each channel without a stylus and adjusting the pair of constants appropriately.

A temporal filter 82 is applied to each of the N channels to reduce the effects of stray oscillatory noise on the channels. Several different kinds of filters may be used. One suitable filter 82 is a 3 point moving average filter. This filter 82 smoothes the data, but does not remove significant fidelity of the signal. The data may be truncated to exclude pulses at the start and end of the pulse train.

Figure 9:
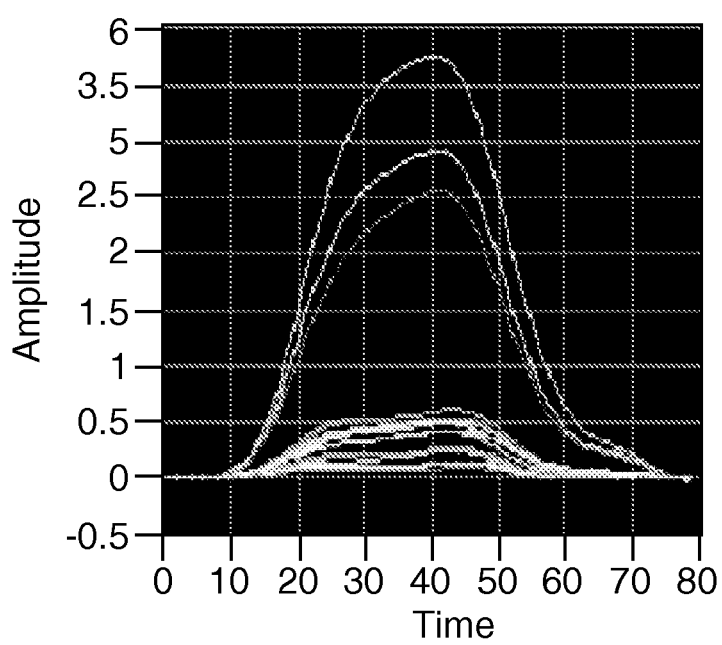
FIG. 9 shows the result of temporal and baseline filtering of the input signal train shown in FIG. 8.

A baseline is then removed from the data by filter 82 to correct for mid- to long-term noise that could affect the absolute maximum value of the peak. One maximum in the pulse train, as well as two points a fixed distance to each side of this maximum, are identified. The two side points are selected a distance from the peak to assure the signal is at baseline. A line is calculated that includes the two side points. The line is then subtracted from the data surrounding the maximum. This effectively removes any sloping baseline around the maximum. FIG. 9 shows the result of temporal and baseline filtering of the input signal train shown in FIG. 8.

Figure 10:
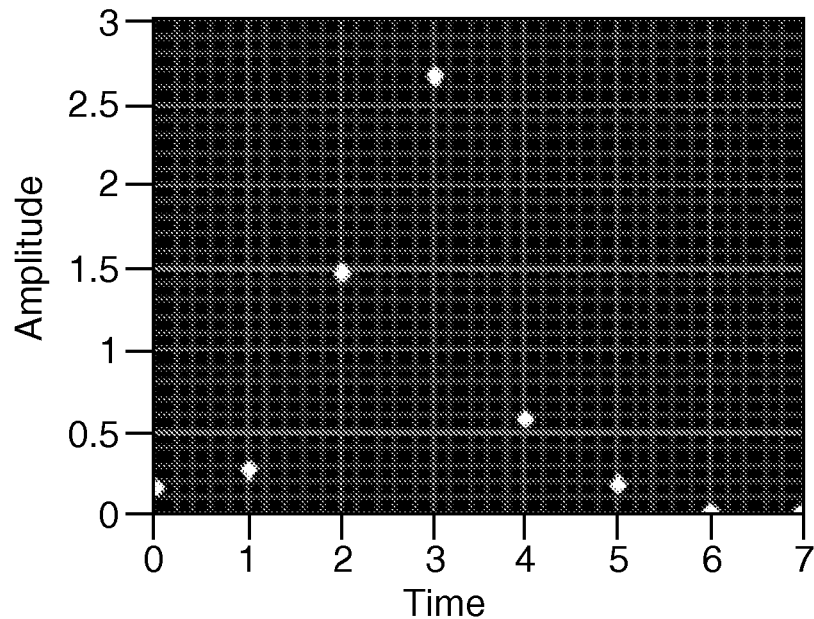
FIG. 10 shows a number of peak points corresponding to the peak amplitudes of channel signals developed for traces of a touch sensor, each peak point determined by a maximum peak locator shown in FIG. 6 using a multiplicity of peak points.

The analytical value for each of the N inputs is then determined using a maximum peak locator 84 by searching for the maximum of the peak. According to one approach, ten points at the top of the peak are averaged to remove high frequency noise and that data is assigned a position. In the graph shown in FIG. 10, only 8 of the sensor traces are shown for simplicity. The graph of FIG. 10 shows that the stylus was held approximately over position '3'. The amplitude values for each trace of the sensor 14 are the output of the preprocessing stage the precedes the curving fitting model 86.

The output values from the maximum peak locator 84 are passed through a curve fitting model 86 that determines the best fit of the data to a selected curve. The curve fitting model 86 may be implemented to use an iterative least squares fitting algorithm to optimize one or more parameters. In the following illustrative example, three such parameters are optimized.

Figure 11:
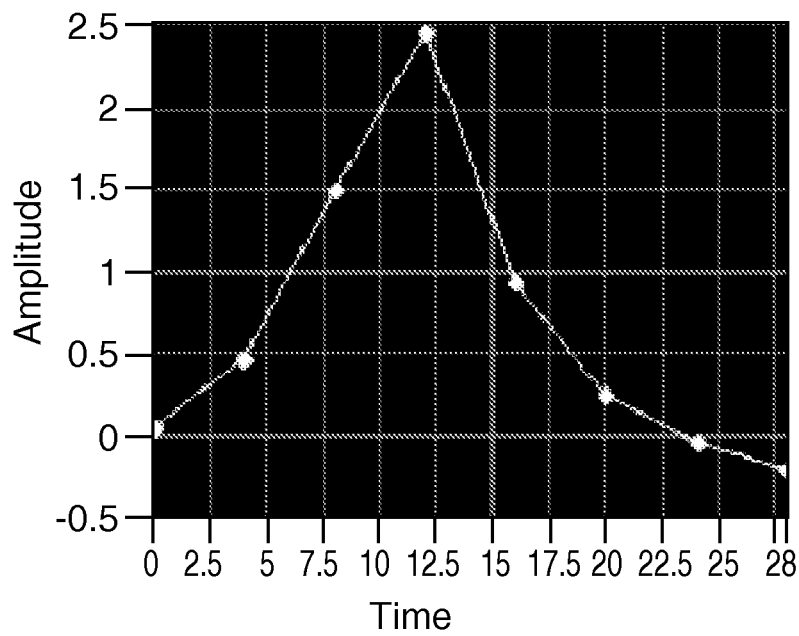
FIG. 11 shows a fitted curve for a typical set of sensor data in accordance with embodiments of the present invention.

The first parameter describes the position of the peak, which is shown over position '3' in FIG. 10. This position represents a prediction of the position of the stylus tip. The second parameter is the amplitude of the peak. This parameter is a metric describing how far the stylus tip is from the sensor. The third parameter describes the width of the peak. Because the curve fitting model 86 is fitting a curve of known shape with minimal fitting parameters, an interpolator 88 can very accurately interpolate between the points. FIG. 11 shows a fitted curve for a typical set of data.

It has been found that the beginning equation used by the curve fitting model 86 can have a significant effect on how well the data can be fitted to the curve. Although conventional curves such as Gaussian and Lorentzian curves may be used, one particular curve implemented by the inventors provides superior results. According to this approach, the curve fitting model 86 uses a curve that is based on an electrostatic model of a fixed charge held above a plane of conductors.

Figure 12:
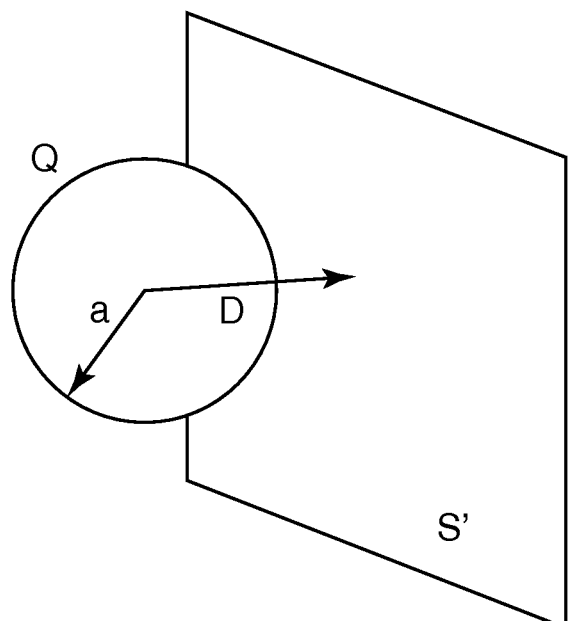
FIGS. 12 and 13 show a depiction of a fixed charge, Q, on a sphere of radius, $\alpha$, held a distance, D, from the center of the sphere to a plane, S', from which a curve that is based on an electrostatic model of the fixed charge held above a plane of conductors may be derived.

Referring now to FIG. 12, there is shown a depiction of a fixed charge, Q, on a sphere of radius, $\alpha$, held a distance, D, from the center of the sphere to a plane, S'. Given that $$r = \frac{a}{2D},$$

it is possible to calculate the capacitance between the sphere and the plane.

This calculation gives the results below:

$$C = \frac{Q}{V} = 4\pi\varepsilon_0 a \left(1 + r + \frac{r^2}{1-r^2} + \frac{r^3}{(1-r^2)\left(1 - \frac{r^2}{(1-r^2)}\right)}\right) \quad [1]$$

This result can be used to define the relative capacitance between the sphere and a trace of a finite width at different distances from the sphere. This is an approximation, and assumes that all traces are the same width and long enough the be considered infinite in length compared to the sphere. Variables are preferably added to this function to take into account baseline shifts and amplification factors. The result is a five variable model describing the affect of the spherical stylus tip on the sensor traces.

The ability to find the capacitance between a sphere and a plane allows for the understanding of how a finger or stylus might interact with a trace in a sensor. Capacitive coupling of an object to a set of X-Y conductive traces forms the basis for several types of touch screen technologies. In some cases, the object is a finger. In others, the object is a stylus or pointer held in the hand. In both of these cases, there exits a capacitance between the trace and the object. The value of that capacitance and the frequency used to drive either the trace or the stylus determine the signal generated by a detection system.

In the case of the illustrative example provided above, the stylus is driven with a 100 kHz signal and the stylus tip voltage is coupled to a set of traces of the sensor. Considering a simple case of a set of long narrow traces that lie parallel to the Y axis and are spaced out along the X axis at some uniform pitch, and a stylus at some height Z above the X-Y origin, it is possible to measure the voltage of each of these traces and generate a plot similar to the one shown in FIG. 11.

The primary objective of a touch location sensing device is to determine the location of a touch in the X-Y plane. Several methods have been used to fit the data to a continuous function to determine the coordinate of the stylus or finger. Linear interpolation, fitting to a Gaussian equation or fitting to a Lorentzian equation have been used previously. As discussed above, and as more fully developed below, the curve fitting model 86 shown in FIG. 6 uses a curve that is based on an electrostatic model of a fixed charge held above a plane of conductors.

It is known that some fields may be calculated by the method of images through successive approximations. By way of illustration, the capacitance of a charged sphere near a grounded conducting plane may be computed in the following manner and in reference to FIG. 13. In the equations below, both the sphere and the plane are replaced by a set of point charges that will maintain these surfaces as equipotentials.

Figure 13:
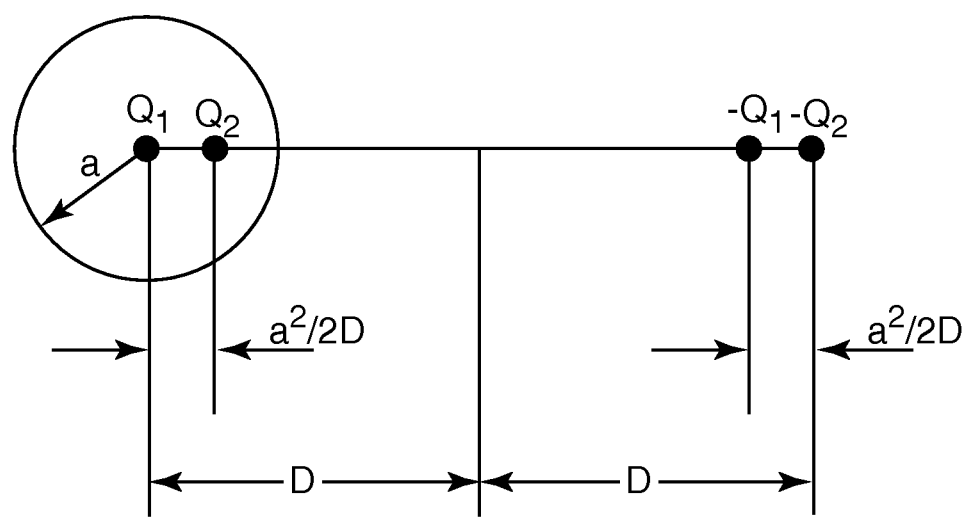

Initially, a charge $Q_1$ is positioned at the center of the sphere, as is shown in FIG. 13, which makes the sphere, but not the plane, an equipotential. The image $(-Q)_1$ of $Q_1$ is positioned to the right of the plane. This makes the plane equipotential, but destroys the spherical equipotential. In response, the image $Q_2$ of $Q_1$ is positioned inside the sphere, making the sphere again equipotential but upsetting the plane. This process is continued, which converges rapidly, until the required precision is achieved.

If $$r = \frac{a}{2D},$$

then the following applies:

$$Q_1 = Q_1$$

$$Q_2 = rQ_1$$

$$Q_3 = \frac{r^2}{1-r^2}Q_1$$

$$Q_4 = \frac{r^3}{(1-r^2)\left(1-\frac{r^2}{1-r^2}\right)}Q_1$$

$$Q_5 = \frac{r^4}{(1-r^2)\left(1-\frac{r^2}{1-r^2}\right)\left(1-\frac{r^2}{\left(1-\left(\frac{r^2}{1-r^2}\right)\right)}\right)}Q_1$$

and so on. The total charge on the sphere is given by:

$$Q = Q_1\left(1 + r + \frac{r^2}{1-r^2} + \ldots\right)$$

It is noted that only $Q_1$ contributes to its potential. The charges $-Q_1$ and $Q_2$ make the potential of the sphere zero. The same is true of all the following pairs of charges. The potential of the sphere is therefore given by:

$$V = \frac{Q_1}{4\pi\epsilon_0 a}$$

The capacitance between the sphere and the plane is given by:

$$C = \frac{Q}{V} = \frac{Q_1(1+r+\ldots)}{\frac{Q_1}{4\pi\epsilon_0 a}} = 4\pi\epsilon_0 a(1+r+\ldots).$$

The presence of the plane thus increases the capacitance of the sphere. Additional details concerning the capacitance of a charged sphere near a grounded conducting plane are found in Paul Lorrain and Dale Corson, *Electromagnetic Fields and Waves*, 2d ed. pp 150-152, W. H. Freeman and Company of San Francisco, Calif. (1970).

Since the signal coupled through this capacitance varies directly as the capacitance varies, all constants may be gathered into a single term k to simplify matters, and only the first four terms need be considered. Given these considerations in this illustrative example, the function behaves in the following manner:

$$r = \frac{a}{2Dis};$$

$$Cap = k * a\left(1 + r + \frac{r^2}{1-r^2} + \frac{r^3}{(1-r^2)\left(1-\frac{r^2}{1-r^2}\right)}\right);$$

$$CapExp = \text{Expand}\left[k * a\left(1 + r + \frac{r^2}{1-r^2} + \frac{r^3}{(1-r^2)\left(1-\frac{r^2}{1-r^2}\right)}\right)\right];$$

$$CapSim = \text{Simplify}[CapExp]$$

$$\frac{a(a^5 - 8a^3 Dis^2 - 16a^2 Dis^3 + 16a Dis^4 + 32 Dis^5)k}{4Dis(a^4 - 6a^2 Dis^2 + 8Dis^4)}$$

The equation above is an expression for describing how the capacitance varies as a function of the distance, Dis, from the center of the sphere. If instead of an infinite plane there is a single series of traces on the same plane parallel to the Y axis, one can determine the approximate capacitance of a trace at location X by substituting the following for Dis (distance) and resolving the equation. Giving values to the constants and setting z to 3, it is possible to solve for capacitance at various x values.

$$Dis = \sqrt{z^2 + x^2};$$

$$CapExp = \text{Expand}\left[k * a\left(1 + r + \frac{r^2}{1-r^2} + \frac{r^3}{(1-r^2)\left(1-\frac{r^2}{1-r^2}\right)}\right)\right];$$

$$CapSim = \text{Simplify}[CapExp]$$

$$\frac{ak(a^5 - 8a^3(x^2 + z^2) - 16a^2(x^2+z^2)^{3/2} + 16a(x^2+z^2)^2 + 32(x^2+z^2)^{5/2})}{4\sqrt{x^2+z^2}\,(a^2 - 4(x^2+z^2))(a^2 - 2(x^2+z^2))}$$

$$x = \text{Range}[-20, 20, 1];$$

$$z = 3;$$

$$a = 1;$$

$$k = 1.0;$$

$$f[x\_] = \frac{ak(a^5 - 8a^3(x^2+z^2) - 16a^2(x^2+z^2)^{3/2} + 16a(x^2+z^2)^2 + 32(x^2+z^2)^{5/2})}{4\sqrt{x^2+z^2}\,(a^2 - 4(x^2+z^2))(a^2 - 2(x^2+z^2))}$$

Figure 14:
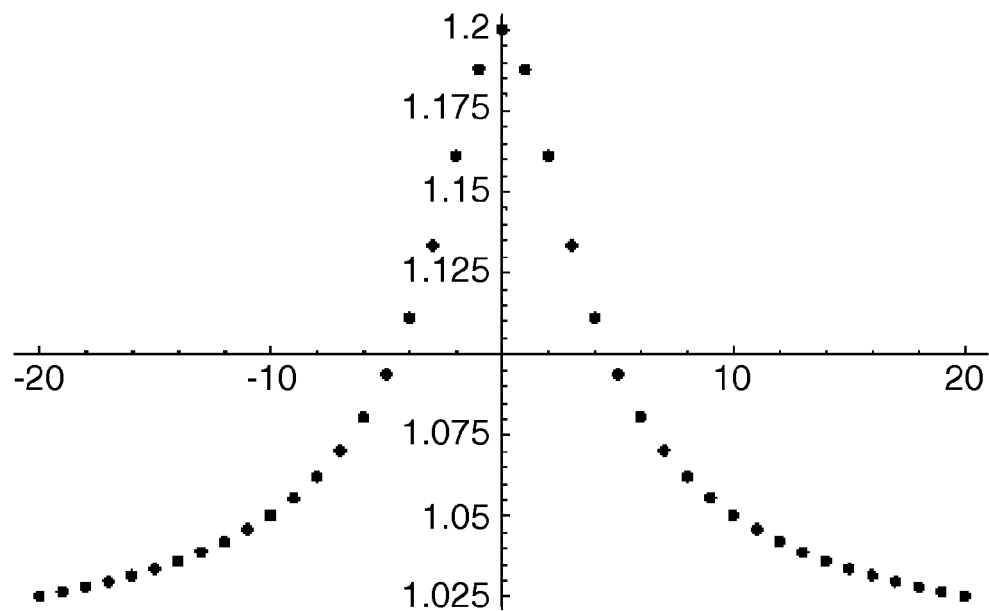
FIG. 14 is a plot of data developed using a curve that is based on an electrostatic model of a fixed charge held above a plane of conductors in accordance with embodiments of the present invention.

A plot of data using the above equation as a function of x is shown in FIG. 14. Inventor measurements of the voltage generated by a stylus have confirmed that the equation above fits experimental data well.

It is desirable to define distance in terms of both x and y, and z. At the same time, additional terms can be added that will allow for positioning of the curve at a location other than the origin.

$$\text{Clear}[x, z, a, k]; \quad [2]$$

$$Dis = \sqrt{z^2 + (x - xpos)^2 + (y - ypos)^2} \; ;$$

$$CapExp = \text{Expand}\left[k * a\left(1 + r + \frac{r^2}{1 - r^2} + \frac{r^3}{(1 - r^2)\left(1 - \frac{r^2}{1 - r^2}\right)}\right)\right]$$

$$CapSim = \text{Simplify}[CapExp]$$

$$f[x\_y\_] = \frac{1}{4} ak \left( 4 + \frac{2a}{\sqrt{(x - xpos)^2 + (y - ypos)^2 + z^2}} - \right.$$

$$\frac{4a^2}{a^2 - 4((x - xpos)^2 + (y - ypos)^2 + z^2)} +$$

$$\left. \frac{a^3}{\sqrt{(x - xpos)^2 + (y - ypos)^2 + z^2}} \right)$$
$$(-a^2 + 2((x - xpos)^2 + (y - ypos)^2 + z^2))$$

The above result can be used to fit two dimensional data collected from a grid of X-Y sensor bars. The two dimensional version produces more points to fit to and should increase accuracy of the fitted position. In experimental conditions, it may be useful to fix the values of k, a, and z at a value of 1.

As was discussed previously with reference to FIG. 6, the output values from the maximum peak locator 84 are passed through a curve fitting model 86 that determines the best fit of the data to a selected curve, preferably a curve based on an electrostatic model of a fixed charge held above a plane of conductors as described in detail above. The curve fitting model 86 may be used to optimize various parameters, including the position of the peak and the amplitude of the peak.

Figure 15:
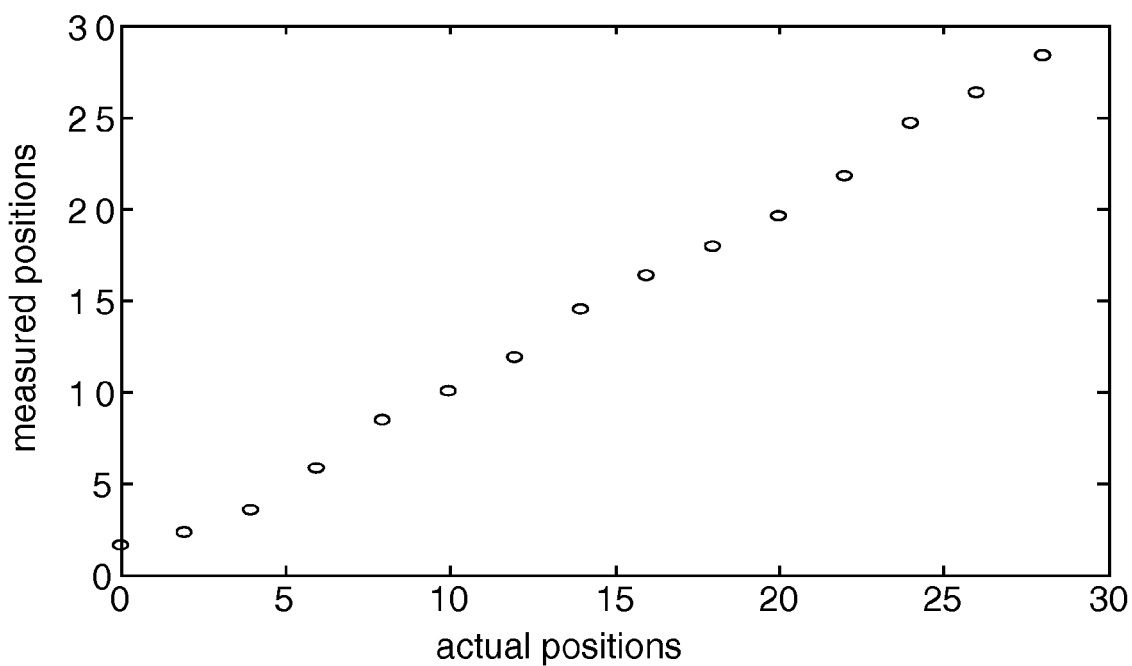
FIG. 15 is a graph showing agreement between predicted position of the stylus versus actual stylus position for one axis in accordance with the present invention.

These two fitting parameters describing the position of the stylus tip and its height from the surface of the sensor may be passed on to a display state machine. The state machine may be configured to use the height of the stylus to determine if the stylus is hovering over, or writing on, the sensor surface. Stylus position may be plotted on a graph as a point if the stylus is writing. If hovering, the state machine may be configured to move a cursor to the position of the stylus, but does not plot a point. FIG. 15 shows the prediction position of the stylus versus the actual position of the stylus for one axis, which are in agreement.

Figure 16:
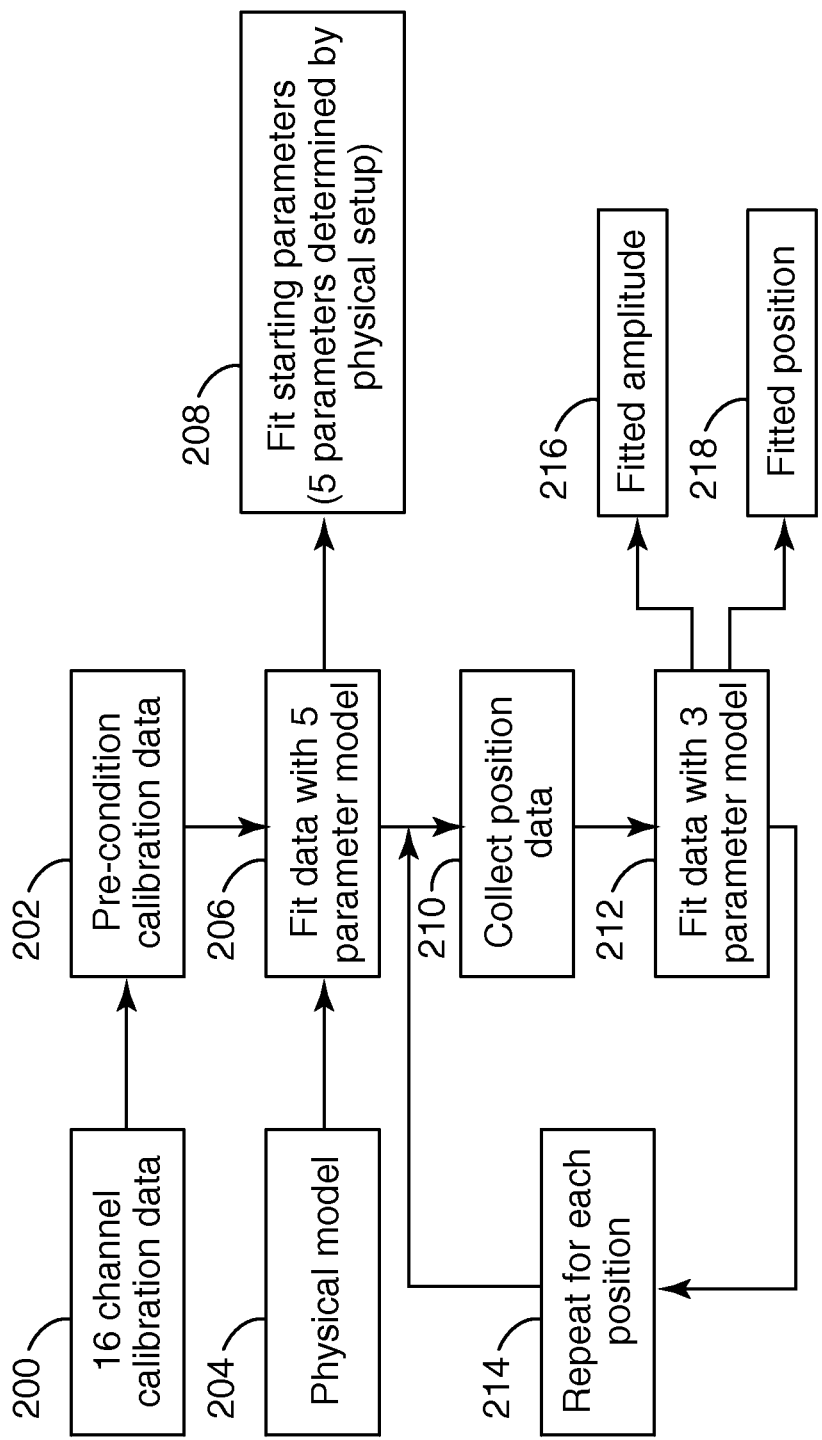
FIG. 16 illustrates various processes associated with stylus position detection in accordance with embodiments of the present invention.

Turning now to FIG. 16, there is illustrated various processes associated with stylus position detection in accordance with embodiments of the present invention. The stylus position detection methodology illustrated in FIG. 16 involves an initial calibration procedure based on the physical sensor setup, after which sensor data may be fitted to a curve that is based on an electrostatic model of a fixed charge held above a plane of conductors, as is discussed above. The processes of FIG. 16 provide for determining the position of the stylus tip when oriented over the surface of the sensor using an algorithm that fits an analytical function based on the above-described electrostatic model to the sensor output data, and interpolates the position of the stylus. Output indicators may be used to dictate whether the stylus is hovering over the sensor surface or touching the sensor surface.

As was previously discussed, the electrostatic model may be defined to contain five separate fitting parameters: three parameters describing the position, and two describing shape.

Equation [2] above may be modified to include all five variables (A, B, C, D, E) to define a fitted curve as follows:

$$E + B(4 + ((2A)/\text{sqrt}((r-C)^2 + D^2)) - ((4A^2)/A^4((r-C)^2 + D^2))) + ((A^3)/\text{sqt}((r-C)^2 + D^2)(-A^2 + 2((r-C)^2 + D^2))))) \quad [3]$$

With continued reference to FIG. 16, a calibration procedure according to embodiments of the present invention may involve holding a stylus over the sensor grid, and collecting signals 200 from the N sensor channels to provide pre-condition calibration data 202. This data is fit 206 in a least squares method to the electrostatic model 204 with the five parameters (A-E) described above.

The two parameters (A, D) describing the shape of the curve are then held constant, and used as inputs for all future fits of the data. In normal use, the N channels of data are collected 210 and fit 212 in a least squares manner to the model using the two fixed parameters (A, D) and the three variable parameters (B, C, E) describing the position of the stylus. The output of this regression is the position 218 of the stylus relative to the sensor and the magnitude 216 of the signal coming from the stylus. This procedure 210-218 is repeated 214 for each change in stylus position.

In accordance with one calibration procedure, a stylus may be affixed with a tip that may have a 2 mm radius. The stylus may be mounted in a stylus holder on an x-motion stage. The stage may be adjusted to move the stylus over the sensor surface in 1 mil increments. The sensor may be fabricated to include N (e.g., 16) traces of 0.75 mm width and centered 3 mm apart, for example. The sensor is preferably connected to a processor or computer, which supports software that coordinates collection of sensor data, as was discussed previously.

The stylus may first be moved away from the surface of the sensor (approximately 5 inches), and a background value taken for each of the N channels. The stylus may then be lowered towards the sensor surface until the stylus tip touches the surface of the sensor (or a spacer), and then raised approximately 1 mil. For the calibration procedure, the stylus tip may be visually aligned over the middle of one of the traces in the middle of the sensor, although other orientations may be used. The values for each of the N lines are then collected by the processor.

The N channels of data may then be fitted to the five parameter electrostatic model defined by equation [3] above. To decrease the model's dependence on starting conditions, a linear interpolation may be used to add 100 points between each of the N channels. In the example of N=16 channels, 1600 data points may be subject to a least squares routine to adjust the five parameters until the model fits the data with minimum residuals.

Figure 17B:
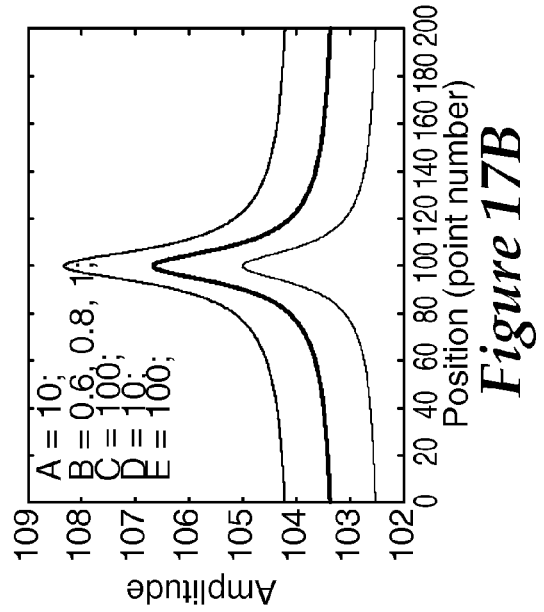
FIGS. 17A-D are plots that show the affects of fitting parameters on the shape of the fitted curve in accordance with embodiments of the present invention.
Figure 17D:
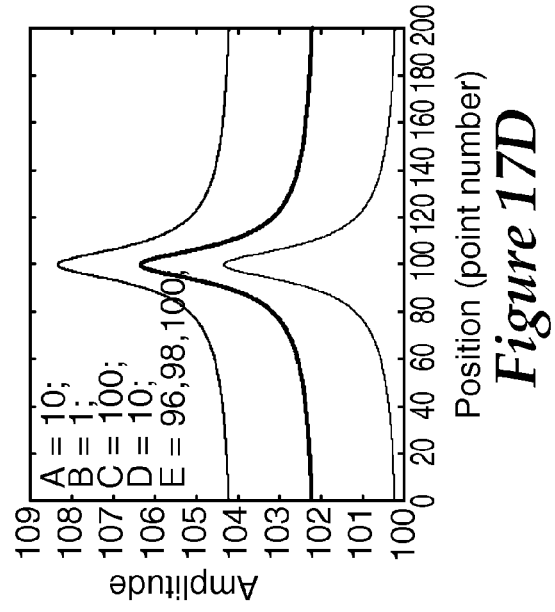
Figure 17A:
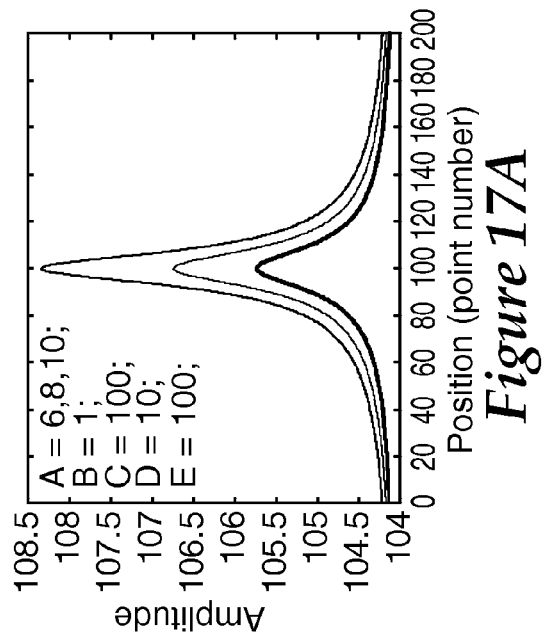
Figure 17C:
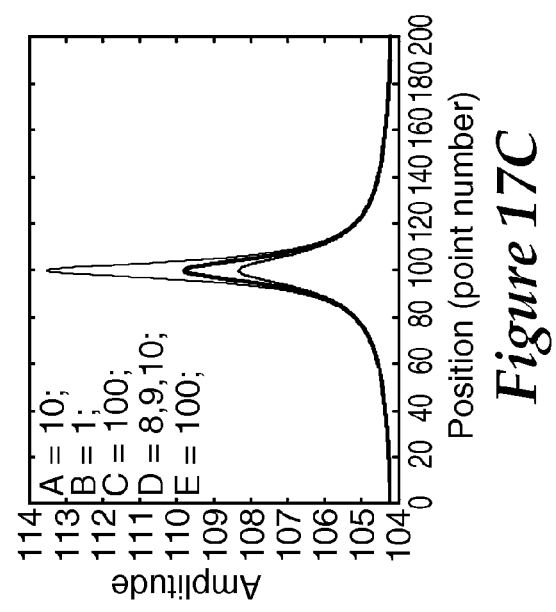
Figure 17E:
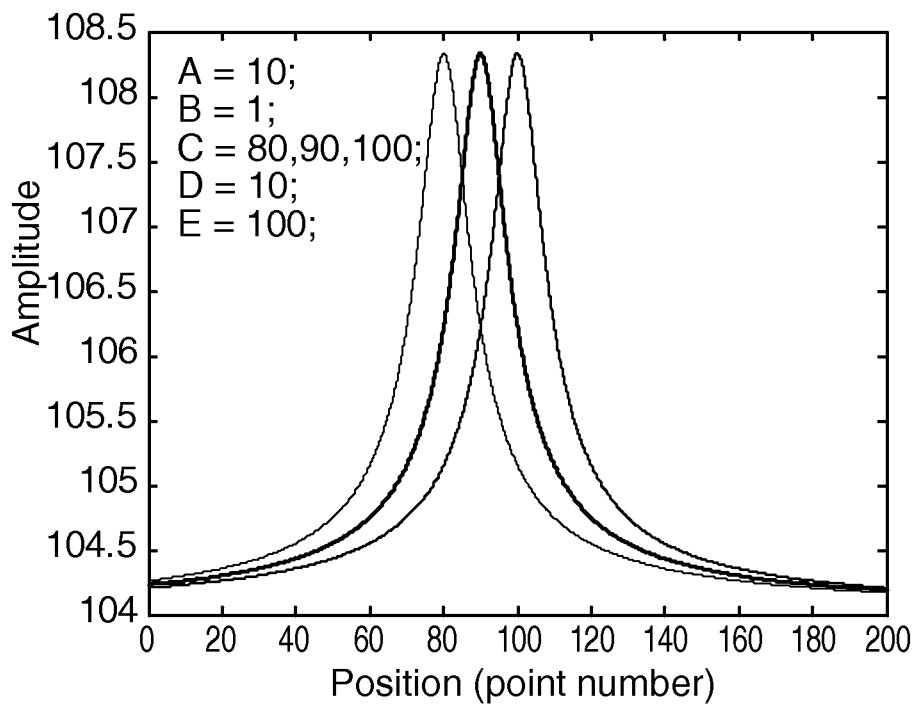
FIG. 17E shows the affect of one of the fitting parameters used to encode the position of the tip of the stylus on the fitting curve in accordance with embodiments of the present invention.

The affects of the five parameters on the fitted curve shape are shown in FIGS. 17A-17E. FIGS. 17A-D show the affects of the parameters on the shape of the fitted curve. FIG. 17A, for example, shows the affects of adjusting parameter A to several values while holding parameters B-E constant. FIG. 17B shows the affects of adjusting parameter B to several values while holding parameters A and C-E constant. FIG. 17C shows the affects of adjusting parameter D to several values while holding parameters A-C and E constant. FIG. 17D shows the affects of adjusting parameter E to several values while holding parameters A-D constant. FIG. 17E shows the affect of the parameter C used to encode the position of the tip of the stylus on the fitting curve, while holding parameters A-B and D-E constant.

Figure 18:
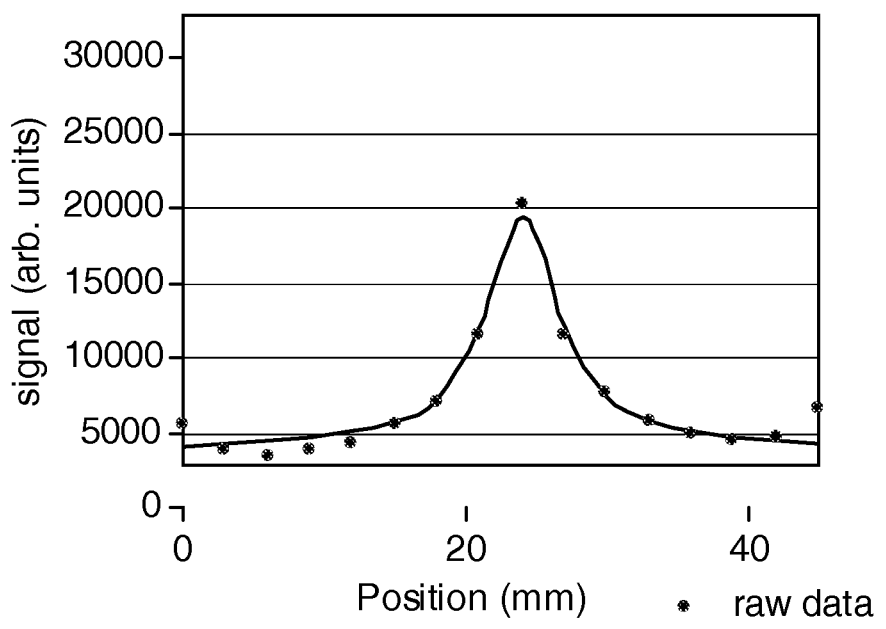
FIG. 18 shows a fitted curve for a typical set of sensor data processed in accordance with embodiments of the present invention.

Following the calibration procedure, parameters A and D are then fixed, and are used for all future fits. Every time a stylus position determination is needed, data from the N channels is collected. This set of data is passed though the curve fit module that determines the best fit of the data to the curve described. The curve fit model uses an iterative least squares fitting algorithm to optimize the three parameters described above as B, C, and E. The first parameter, B, is a multiplicative factor, while parameter E is an additive offset. Parameter C describes the position of the peak. This position represents a prediction of the position of the stylus tip. Because the processor is fitting a curve of known shape with minimal fitting parameters, the processor can very accurately interpolate between the points. The fitted curve for a typical set of data (for N=16 channels in this example) is plotted in FIG. 18.

Figure 19:
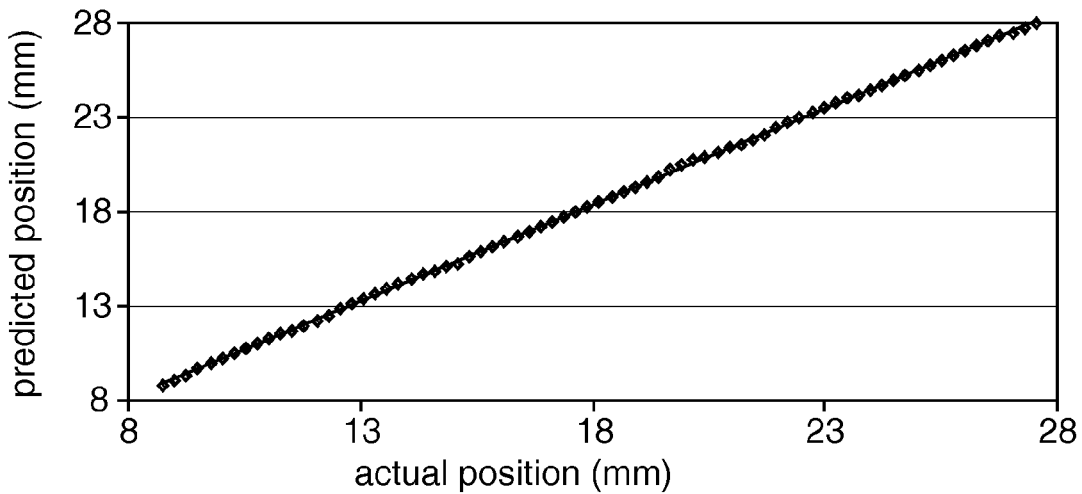
FIG. 19 is a plot showing actual stylus position versus fitted position for many stylus positions across a sensor in accordance with embodiments of the present invention.
Figure 20:
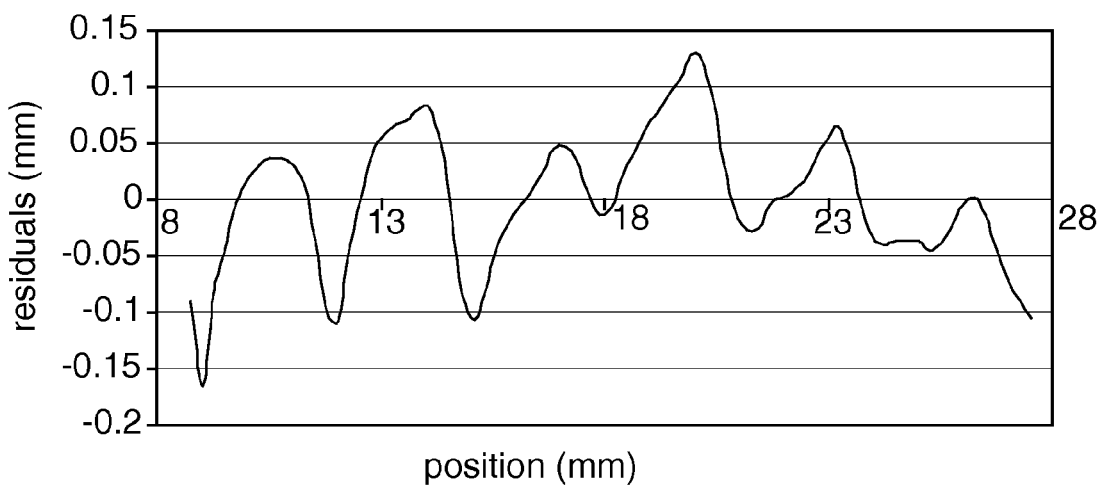
FIG. 20 is a plot showing residuals of the fitted stylus position versus actual stylus position, the plot showing the error in the prediction of position versus position in accordance with embodiments of the present invention.

To verify the efficacy of the stylus position determination procedure discussed above, the stylus was stepped at 1 mil increments across the surface of the sensor. The position of the stylus tip, as calculated from the above described algorithm, was plotted versus the actual stylus tip position. This plot is shown in FIG. 19. The non-systematic error of the prediction may be highlighted by plotting the difference between the actual data and the best fit line. This residuals graph is shown in FIG. 20. It can be seen from the graph of FIG. 20 that there is a periodic error that corresponds to the pitch of the sensor traces.

The illustrative example discussed above may be modified to optimize the fit for minimum error. For example, the number of channels of data fed into the fitting algorithm may be adjusted. This number could be lowered or raised to minimize error. The fitting algorithm can also be extended to fit both X and Y data simultaneously, further minimizing random noise by including more points into the fitting algorithm.

A stylus position detection methodology described herein provides several advantages, including determining stylus position to a high degree of accuracy and reducing positional noise due to the averaging effect of the least squares fit. The detection methodology can correct for position at the edge of the sensor/digitizing surface, where one side of the data is sparse. The method also provides an output measure of the stylus height, which can be used for determining stylus hover.

Figure 21:
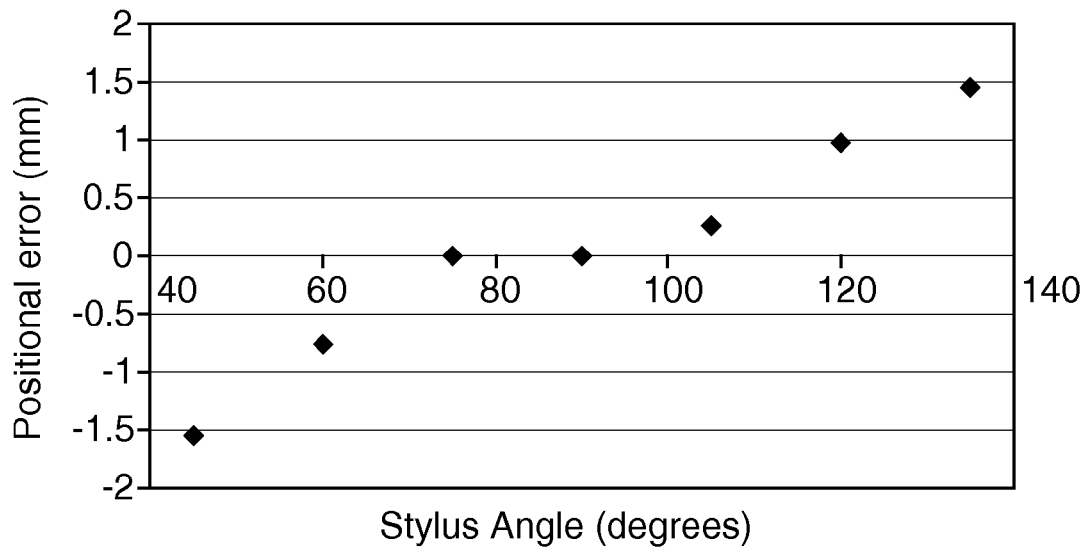
FIG. 21 is a plot showing the positional error that is induced by changes in the angle of the stylus.

It is important to be able to determine the angle that a stylus is held over the surface of a touch location sensing device, such as a digitizer. In high precision applications, for example, it has been found that the angle of the stylus can introduce significant errors to the reported position of the stylus. For example, systems of the present invention may be implemented to provide for stylus position determinations to within 25 microns of actual stylus position. Positional error induced by the angle of the stylus can be as large as 35 microns, significantly larger than the target accuracy of 25 microns in this illustrative example. An example of this error is shown in FIG. 21, which illustrates the positional error induced by changes in the angle of the stylus.

In accordance with embodiments of the present invention, when the stylus is angled relative to the sensor surface, the fitting algorithm may be implemented so as to predict stylus tip position with an error proportional to the angle. Using the angle, this error can be removed. Additionally, the angle can be used as an analytical parameter to uniquely identify signatures or handwriting. According to embodiments of the present invention, the angle of a stylus held over a digitizing medium may be determined based on the asymmetry, or skew, of the best fit to the data.

Figure 23A:
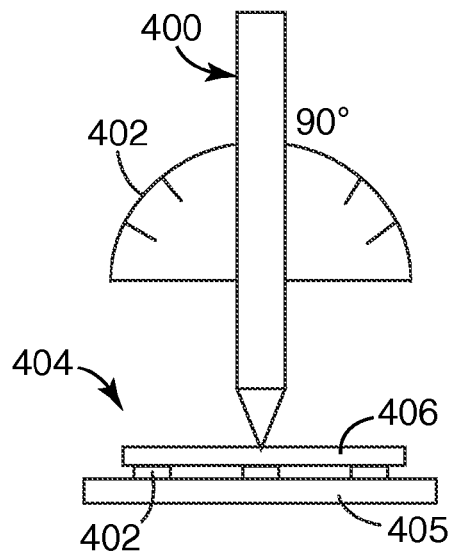
FIGS. 23A and 23B are diagrams of a physical setup that may be used to determine the affects of stylus angle on sensor output signals in accordance with embodiments of the present invention.
Figure 23B:
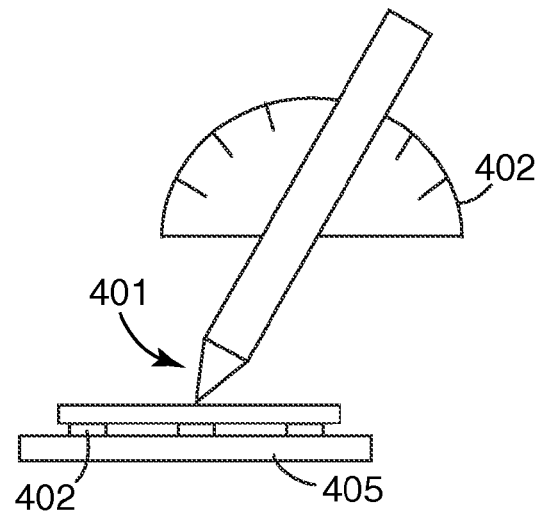

In accordance with one illustrative embodiment, and with reference to FIGS. 23A and 23B, a stylus 400 may be affixed with a tip 401 that has a 2 mm radius, for example. The stylus 400 is shown mounted in a stylus holder 402 with protracted angle settings. In this illustrative example, the sensor 404 is shown to include a surface 406 and a substrate 405 on which N traces 402 of 0.75 mm width are patterned and centered 3 mm apart. The sensor 404 is preferably connected to a processor or computer, which supports software that coordinates collection of sensor data, as was discussed previously.

According to one approach, the stylus 400 may first be moved away from the surface 406 of the sensor 404 (approximately 5 inches), and a background value taken for each of the N channels. The stylus 400 may then be lowered towards the sensor 404 until the stylus tip 401 touches the sensor surface 406 (or a spacer), then it may be raised approximately 1 mil. The stylus tip 401 may be visually aligned over the middle of one of the traces 402 in the middle of the sensor 404. Data for the N channels is then collected. This process is repeated for each of a number of settings of the angle of the stylus, such as angles ranging from 45 degrees to 135 degrees, for example. The collected data may then be analyzed in accordance with the flow chart shown in FIG. 22.

Referring now to FIG. 22, there is shown a flow diagram of a method for determining stylus angle and correcting for angle induced positional error in accordance with embodiments of the present invention. With reference to FIG. 22, and as previously described with reference to FIG. 16, N channels (e.g., 16) of sensor data 200 is collected and fit 212 in a least squares manner to an electrostatic model using the two fixed parameters (A, D) and the three variable parameters (B, C, E) describing the position of the stylus. The output of this regression is the position 218 of the stylus relative to the sensor and the magnitude 216 of the signal coming from the stylus. This procedure is repeated for each change in stylus position.

Figure 24A:
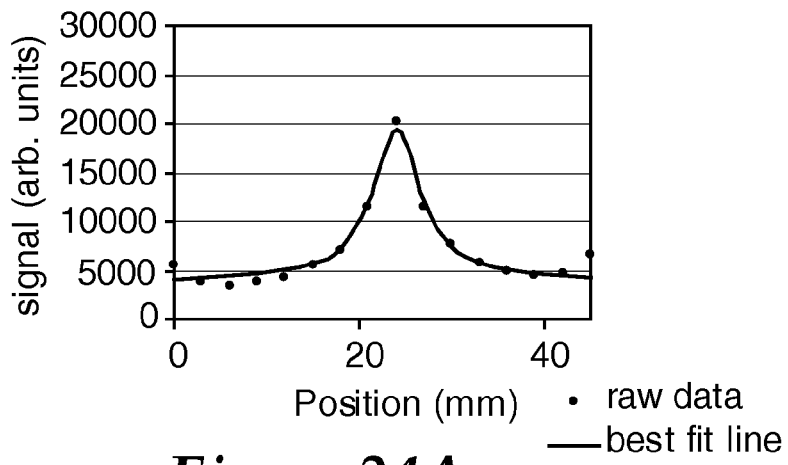
FIGS. 24A-24C are plots of raw sensor data and best fit lines for various angles of the stylus in accordance with embodiments of the present invention.
Figure 24B:
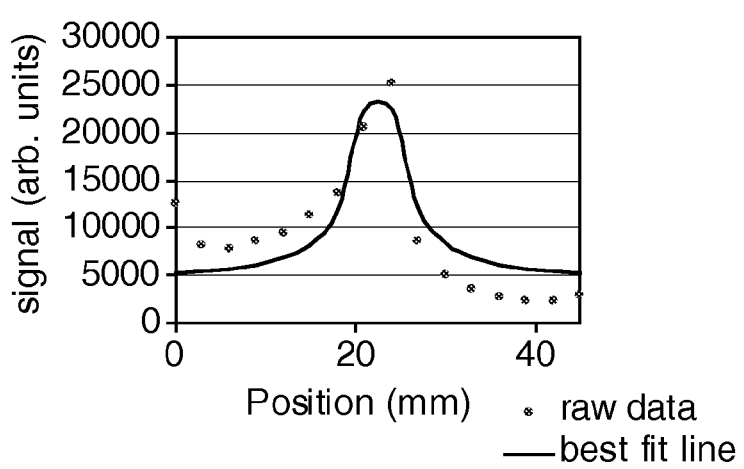
Figure 24C:
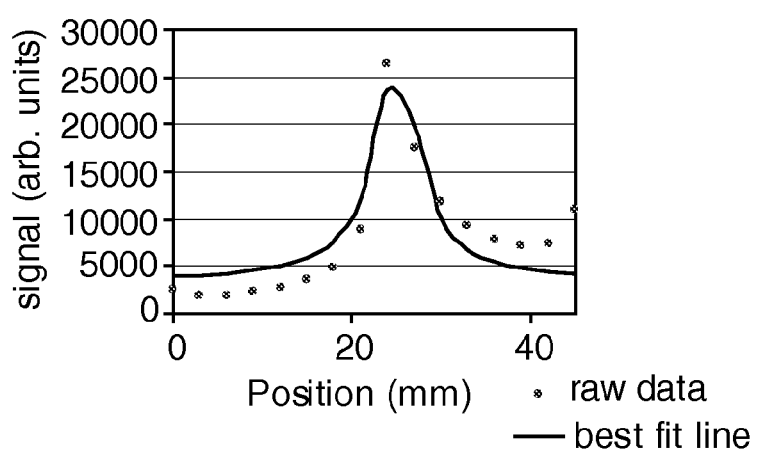

It is noted that the five parameter fit (see blocks 206 and 208 of FIG. 16) is initially performed on the 90 degree stylus data to determine the starting parameters for all subsequent fits. Each of the stylus angle data sets may be fit using a three parameter fit 212 and these starting parameters. Illustrative raw data and best fit lines are shown in FIGS. 24A-C for various angles of the stylus.

Figure 25:
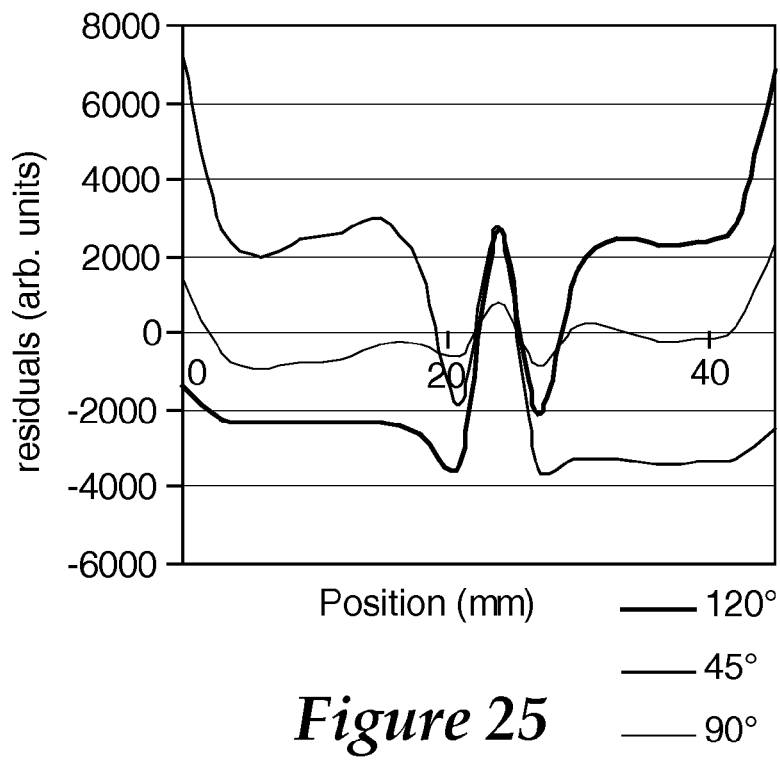
FIG. 25 is a plot of residuals for various angles of the stylus, the residuals calculated by subtracting the best fit line from the raw data in accordance with embodiments of the present invention.

The differences between the raw sensor data 200 and the fit 212, referred to as the residuals, are calculated 300, and a skew parameter 304 is determined 302 by comparing the difference in residual on both sides of the stylus, along one dimension. The residuals may be calculated by subtracting the best fit line from the raw data. The residuals for various angles of the stylus are shown in FIG. 25. It can be seen that the fit matches the 90 degree curve fairly well, but fails at the edges of the tipped stylus with the sign of the mismatch pointing to the direction of the tip.

Figure 26:
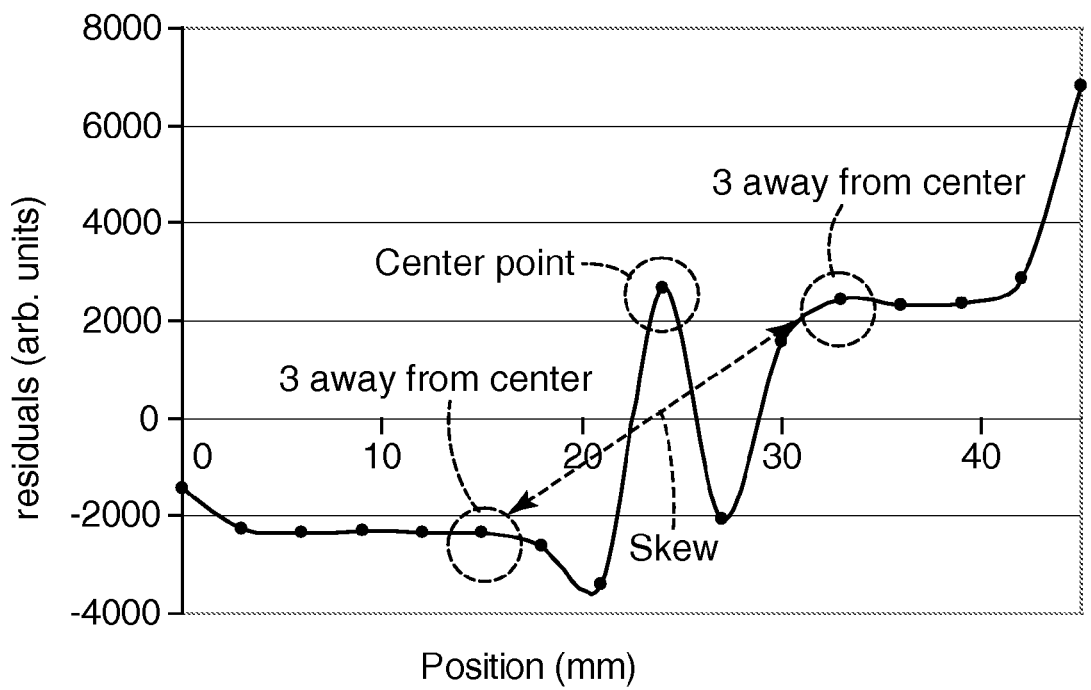
FIG. 26 is a plot of residuals verses position from which skew may be determined using a 3-away method in accordance with embodiments of the present invention.

The skew 304 may be determined using several methods. For example, the stylus tip position may be determined by looking at the raw data. Points may be identified on either side of the peak at a fixed distance from the peak. The difference between these two values is a measure of the skew 304. Another method involves taking the average of all the points on either side of the peak and then taking the difference. This method is shown in FIG. 26 for residuals for the stylus tilted at 120 degrees. As is shown in FIG. 26, skew may be determined using a 3-away method, in which the points that are within three points from the center peak point are used in the difference computation.

Figure 27:
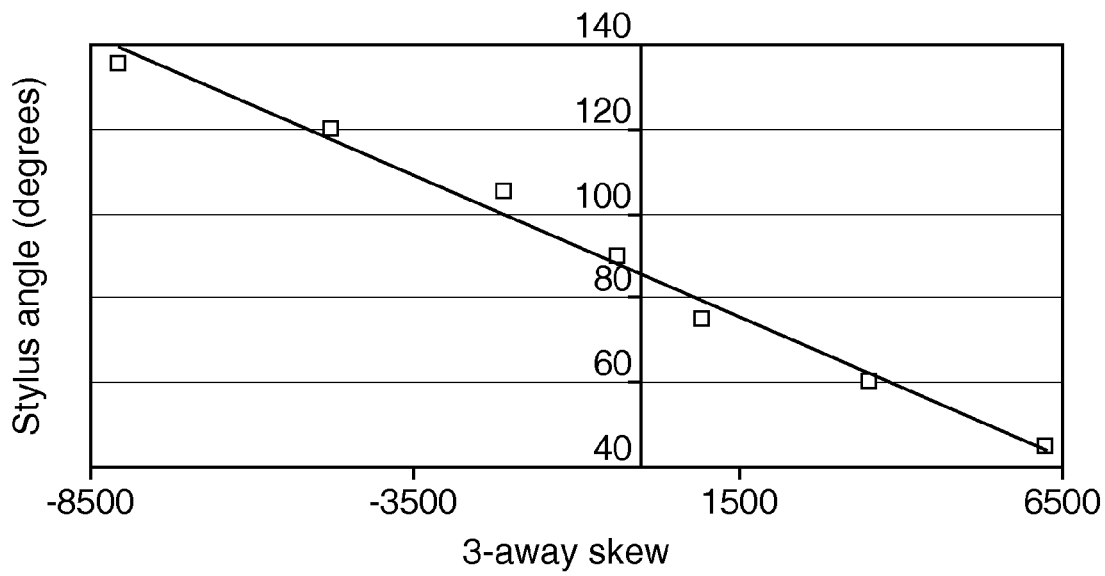
FIG. 27 shows a function useful for determining the angle of the stylus using skew in accordance with embodiments of the present invention.

The skew value 304, together with predetermined skew verses stylus angle calibration data 312, is used to calculate 314 the angle 316 of the stylus. The predetermined skew verses stylus angle calibration data 312 describes how the angle of the stylus tip position varies with skew. A function for characterizing the predetermined skew verses stylus angle calibration data 312 may be previously calibrated, as it will depend on tip radius and other physical parameters of the system. FIG. 27 shows a function useful for determining the angle of the stylus using skew.

Figure 28:
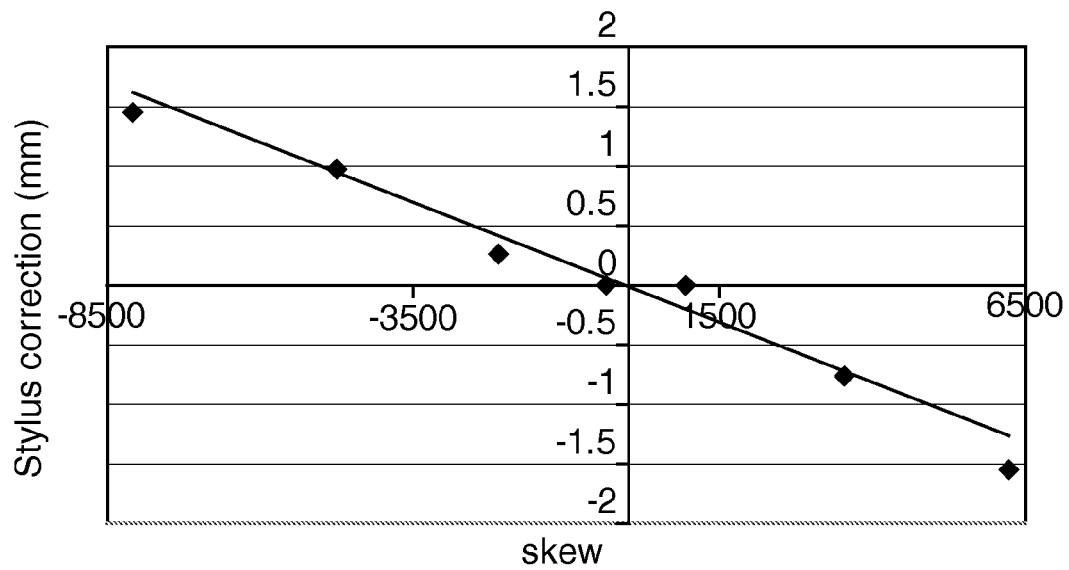
FIG. 28 shows a useful function for correcting the position of the stylus using skew in accordance with embodiments of the present invention.

The skew value 304, together with predetermined skew verses stylus tip position error calibration data 306, is used to correct 308 the predicted stylus position to compute the correct stylus position 310 for this angle 316. The predetermined skew verses stylus tip position error calibration data 306 describes how the error of the stylus tip position varies with skew. The correction may be added to the position outputted by the fitting function. A function for characterizing the predetermined skew verses stylus tip position error calibration data 306 may be previously calibrated, as it will depend on tip radius and other physical parameters of the system. FIG. 28 shows a useful function for correcting the position of the stylus using skew.

The examples discussed above show the determination of stylus angle in one direction. The methods discussed above may be applied to calculate the absolute stylus angle by simple vector addition of the angles separately calculated along the x and y axis. Also, by adding an addition correction offset to the tip position correction function, the methods can correct for parallax of the stylus due to the offset of the writing surface from the display.

Methods of determining stylus angle in accordance with the present invention provide for several advantages, including accurately determining stylus angle at every position of the stylus, which provides for enhanced security for handwriting and signature recognition applications. Other advantages include correction of cursor position based on stylus angle. This can significantly increase the accuracy of the reported position of the stylus. Further advantages include correction of parallax due to the writing surface and display being separated by a distance. Also, such methods are not computationally intensive above and beyond the calculation of position.

The foregoing description of the various embodiments of the invention has been presented for the purposes of illustration and description. It is not intended to be exhaustive or to limit the invention to the precise form disclosed. Many modifications and variations are possible in light of the above teaching. For example, the detection methodologies described herein may be used in connection with a wide variety of touch implements, including tethered implements and implements that house a battery or other power source. It is intended that the scope of the invention be limited not by this detailed description, but rather by the claims appended hereto.

What is claimed is:

1. A detection method for use in a touch location sensing device comprising a capacitive touch sensor having a touch surface, the method comprising:
   developing touch signals at the touch sensor in response to a touch implement on or near the touch surface;
   fitting data associated with the touch signals to a predefined curve, the predefined curve defined by a charged sphere near a conducting plane; and
   determining a location of the touch implement relative to the touch surface using the predefined curve to which the data is fitted.

2. The method of claim 1, wherein the predefined curve is further defined by a capacitance that varies as a function of distance between the charged sphere and the conducting plane.

3. The method of claim 1, wherein the predefined curve is further defined by sets of point charges representative of the charged sphere and conducting plane, respectively, that maintain the charged sphere and conducting plane as equipotentials.

4. The method of claim 1, wherein determining the location comprises interpolating the location using the predefined curve.

5. The method of claim 1, wherein determining the location comprises determining both an X-Y position and a height of the touch implement relative to the touch surface.

6. The method of claim 1, wherein:
   the touch sensor comprises a plurality of grid conductors; and
   fitting data associated with the touch signals comprises fitting data associated with a touch signal developed at each of the plurality of grid conductors.

7. The method of claim 1, wherein the touch implement comprises a finger, and the end of the touch implement comprises a tip of the finger.

8. The method of claim 1, wherein the touch implement comprises a stylus.

9. The method of claim 1, wherein the touch implement comprises an untethered battery-less stylus, the method further comprising:
   generating a drive signal at the touch location sensing device;
   energizing the stylus using the drive signal;
   transmitting a stylus signal from the energized stylus to the touch sensor;
   developing stylus touch signals at the touch sensor in response to the stylus signal; and
   determining a location of the stylus relative to the touch surface using the predefined curve to which data associated with the stylus touch signals is fitted.

10. The method of claim 9, wherein determining the location of the stylus comprises determining both an X-Y position and a height of the stylus relative to the touch surface.

11. The method of claim 9, comprising:
    performing envelope detection on the stylus touch signals;
    digitizing the envelope signals; and
    determining one or both of the location and a height of the stylus relative to the touch surface using the predefined curve to which data associated with the digitized envelope signals is fitted.

12. The method of claim 9, further comprising indicating the location of the stylus in a first manner when the stylus is in contact with the touch surface, and indicating the location of the stylus in a second manner differing from the first manner when the stylus is hovering relative to the touch surface.

13. The method of claim 12, wherein the first manner comprises presenting a point or other indicia on a display at a location indicative of stylus contact on the touch surface, and the second manner comprises presenting a cursor on the display at a location approximating that of the hovering stylus relative to the touch surface.

14. The method of claim 9, comprising determining an angle of the stylus relative to the touch sensor.

15. The method of claim 14, wherein the angle is determined based on skew of the residual data.

16. The method of claim 14, wherein determining the location of the stylus relative to the touch surface comprises correcting for the angle of the stylus when determining stylus location.

17. The method of claim 16, wherein the angle is corrected based on skew of the residual data.

18. The method of claim 9, wherein transmitting the stylus signal comprises transmitting information indicative of one or more stylus states from the energized stylus to the touch sensor.

19. The method of claim 18, wherein the stylus states comprise one or more states equivalent to one or more mouse states.

20. A touch location sensing device, comprising:
a touch sensor comprising a touch surface and one or more transducers configured to generate touch signals responsive to a touch implement on or near the touch surface; and
a processor coupled to the touch sensor, the processor configured to fit data associated with the touch signals with a predefined curve, the predefined curve defined by a charged sphere near a conducting plane, the processor further configured to determine a location of the touch implement relative to the touch surface using the predefined curve to which the data is fitted.

21. The device of claim 20, further comprising:
drive circuitry provided at the touch sensor and configured to generate a drive signal; and
an untethered battery-less stylus comprising circuitry energized by the drive signal, the stylus configured to transmit a stylus signal in response to the drive signal;
wherein stylus touch signals are developed at the touch sensor in response to the stylus signal, and the processor is configured to determine a location of the stylus relative to the touch surface using the predefined curve to which data associated with the stylus touch signals is fitted.

22. The device of claim 21, further comprising:
conditioning circuitry comprising an envelope detector coupled to the touch sensor and configured to perform envelope detection on the touch signals to produce envelope signals, and an analog-to-digital converter configured to digitize the envelope signals;
wherein the processor is coupled to the conditioning circuitry and configured to determine one or both of the location and a height of the stylus relative to the touch surface using the predefined curve to which data associated with the digitized envelope signals is fitted.

23. The device of claim 20, wherein the processor is configured to determine an angle of the touch implement relative to the touch sensor.

24. The device of claim 23, wherein the processor is configured to determine the angle based on skew of the residual data.

25. The device of claim 23, wherein the processor is configured to correct for the angle of the stylus when determining stylus location.

26. The device of claim 23, wherein the processor is configured to correct for the angle based on skew of the residual data.

27. The device of claim 20, comprising a display coupled to the processor.

28. The device of claim 20, wherein the touch sensor comprises a matrix capacitive touch sensor.

29. The device of claim 20, wherein the predefined curve is further defined by a capacitance that varies as a function of distance between the charged sphere and the conducting plane.

30. The device of claim 20, wherein the predefined curve is further defined by sets of point charges representative of the charged sphere and conducting plane that maintains the charged sphere and conducting plane as equipotentials.

31. The device of claim 20, wherein the processor is configured to interpolate the location using the predefined curve.

32. A touch location sensing device, comprising:
means for developing touch signals at the touch sensor in response to a touch implement on or near the touch surface;
means for fitting data associated with the touch signals to a predefined curve, the predefined curve defined by a charged sphere near a conducting plane; and
means for determining a location of the touch implement relative to the touch surface using the predefined curve to which the data is fitted.

33. The device of claim 32, further comprising means for determining an angle of the touch implement relative to the touch sensor.

34. The device of claim 33, further comprising means for correcting for the angle when determining the location of the touch implement relative to the touch surface.

* * * * *